April 17, 1951     B. E. DEL MAR     2,549,673

PRESSURE CONTROL SYSTEM FOR AIRCRAFT CABINS

Filed May 13, 1946     6 Sheets-Sheet 1

INVENTOR.
BRUCE E. DEL MAR
BY
Edwin Coates
ATTORNEY

INVENTOR.
BRUCE E. DEL MAR
BY Edwin Coates
ATTORNEY

April 17, 1951  B. E. DEL MAR  2,549,673
PRESSURE CONTROL SYSTEM FOR AIRCRAFT CABINS
Filed May 13, 1946  6 Sheets-Sheet 4
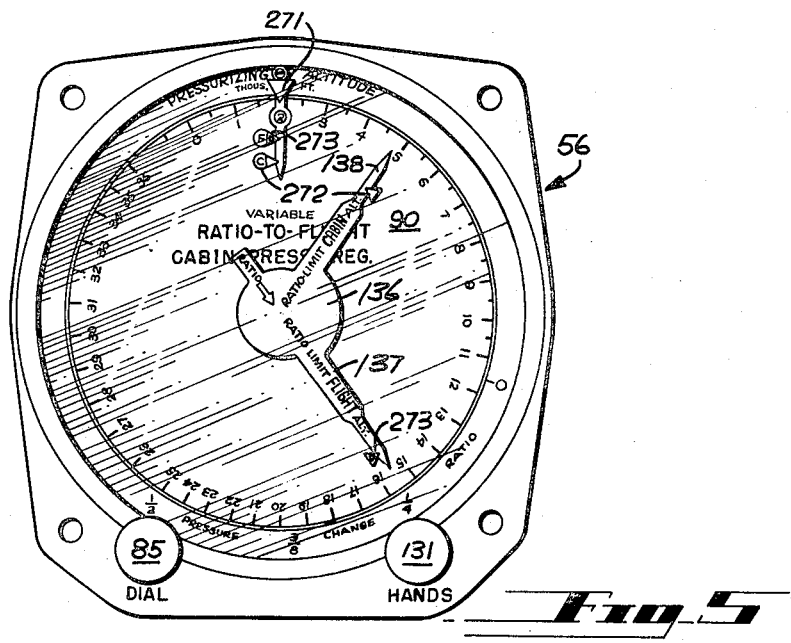
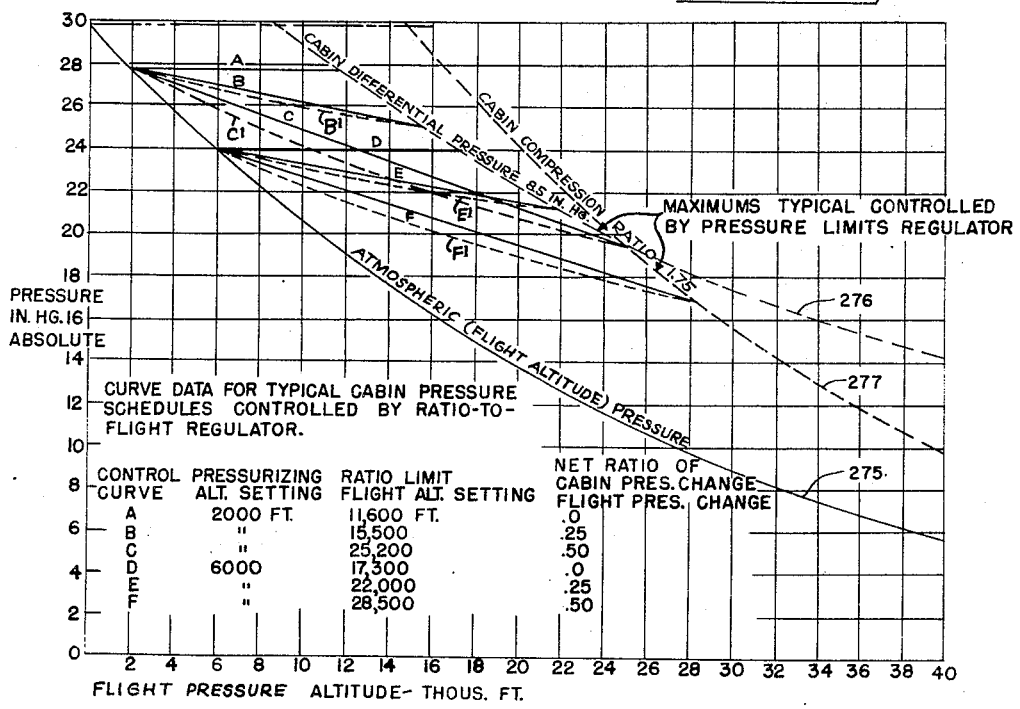
INVENTOR.
BRUCE E. DEL MAR
BY Edwin Coates
ATTORNEY April 17, 1951        B. E. DEL MAR        2,549,673
PRESSURE CONTROL SYSTEM FOR AIRCRAFT CABINS
Filed May 13, 1946        6 Sheets-Sheet 5
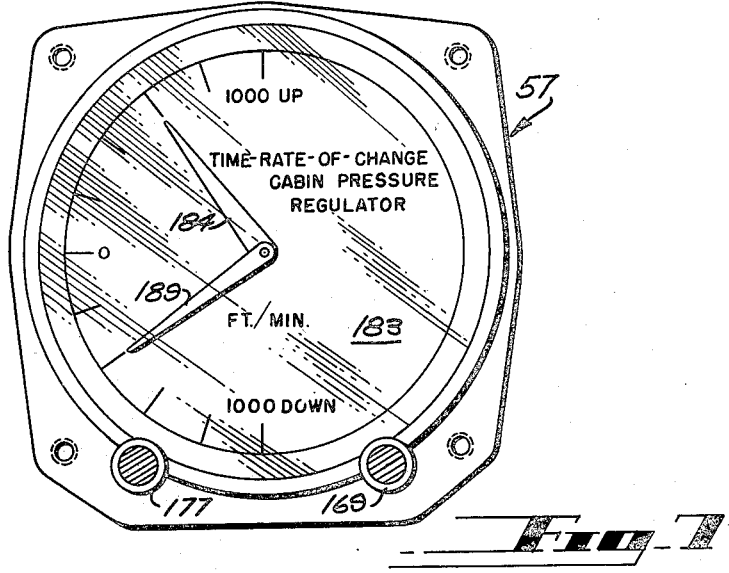
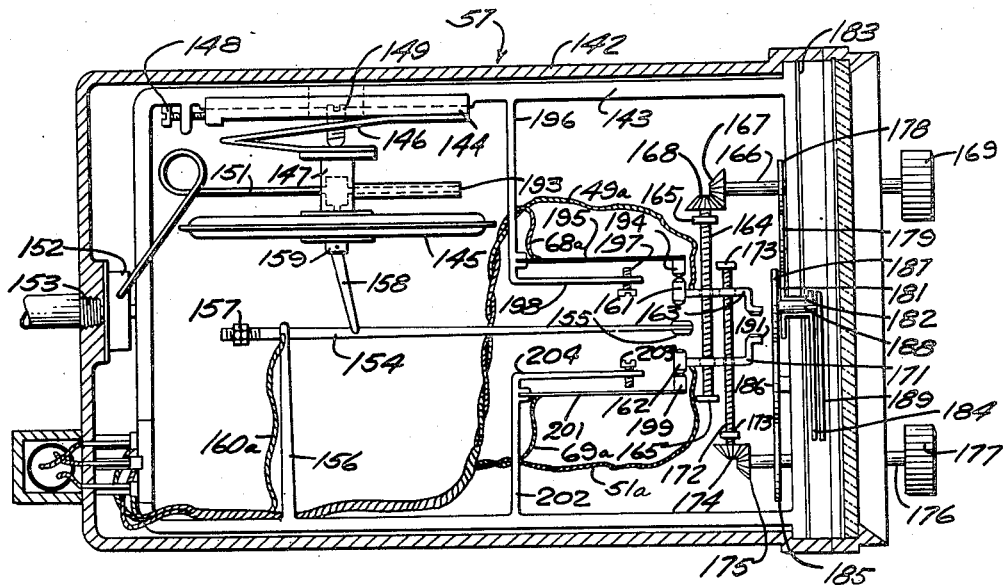
INVENTOR.
BRUCE E. DEL MAR
BY Edwin Coates
ATTORNEY April 17, 1951  B. E. DEL MAR  2,549,673
PRESSURE CONTROL SYSTEM FOR AIRCRAFT CABINS
Filed May 13, 1946  6 Sheets—Sheet 6

INVENTOR.
BRUCE E. DEL MAR
BY Edwin Coates
ATTORNEY

Patented Apr. 17, 1951

2,549,673

UNITED STATES PATENT OFFICE 2,549,673

PRESSURE CONTROL SYSTEM FOR AIRCRAFT CABINS

Bruce E. Del Mar, Los Angeles, Calif., assignor to Douglas Aircraft Company, Inc., Santa Monica, Calif.

Application May 13, 1946, Serial No. 669,366

30 Claims. (Cl. 98—1.5)

1

This invention relates to the control of pressure in sealed cabins such as those of aircraft in order to isolate flight personnel from uncomfortable changes in pressure and low values of absolute pressure experienced at high altitudes.

It is well known that pressure changes encountered in flight may cause considerable discomfort, and that the low pressures encountered at higher altitudes necessarily limit the flight altitudes of aircraft not provided with supercharged cabins. Considerable development has been undertaken in the past toward providing means to control the pressure in aircraft cabins along certain predetermined schedules.

It was soon found that it was not practical to maintain the absolute pressure in the cabin at values normally encountered at airport levels due to extreme penalties in weight and power. Furthermore, it was found that passengers could readily tolerate the lower absolute pressure corresponding to an intermediate altitude somewhat above airport levels. Initial efforts were directed toward simply maintaining cabin pressure constant at an intermediate value whenever flight above that prescribed level was attempted and in conjunction therewith, a schedule of maximum pressure difference between the cabin and the flight atmosphere was prescribed at a convenient value so that whenever flight was attempted above a predetermined level, the absolute pressure in the cabin thereafter would decrease and maintain the pressure difference between cabin interior and exterior constant at a safe limit differential pressure value.

Control of cabin pressure at the constant value of an intermediate altitude was soon found impractical since it is obvious that little had been achieved in isolating the occupants from the rather rapid changes in pressure during flight up to and down from the prescribed control level which is in a region where the air is most dense and where the pressure thereof changes most rapidly with changes in altitude. To achieve results in this direction the next step taken was to add to the aforementioned control, a time rate of cabin pressure change control whereby cabin pressure could be set to increase or decrease in increments corresponding to a chosen rate of altitude change until the intermediate pressure value was attained on ascent, or until cabin pressure was equalized with flight pressure during descent. This mode of control has proven entirely inadequate as the operator must continually "fly" the cabin pressures by setting its controls not only at critical times upon starting ascent and descent of the aircraft, but also to reset these controls under continual observation during ascents and descents in order to attempt to isolate the cabin from uncomfortable pressure influences caused by change of flight pressure altitudes when approaching limit differential pressure or upon approach to the landing field. Failure on the part of the operator to accurately predict the ascent or descent pattern of the aircraft in flight with this type of control imposes unreasonable discomfort on the passengers by greater rates of pressure change than necessary. The constant attention required if reasonable results are to be expected constitutes a costly annoyance and much more should reasonably be expected from a truly automatic control.

Systems have also been previously proposed which controlled cabin pressure in some predetermined relation to the change in pressure of the flight atmosphere so that the unreasonable burden of resetting the cabin pressure controls at critical times could be avoided. Such systems have failed to vary cabin absolute pressure for the occupants in terms of the very function upon which all ascents or descents are of necessity guided: an equal increment of flight altitude per unit of time. Instead such systems have proposed to vary cabin absolute pressure in proportion to changes in flight pressure and since air becomes rapidly more dense at low altitudes, the cabin pressure during ascents and descents change very rapidly at the low altitudes and considerably less rapid during ascents or descents at the higher altitudes.

The control system of the present invention obviates the difficulties had with previously proposed devices by providing means for controlling the absolute pressure within the cabin as a straight line function of the altitude of the aircraft, that is, altitude used in the standard aeronautical sense as meaning altitude based on absolute pressure in the standard international atmosphere and altitude as used herein is intended to mean pressure altitude.

The cabin pressure control effected by the control device of the present invention automatically produces without contingency or guesswork the slowest and therefore the most comfortable pressure change rate for the cabin occupants during descents and ascents generally encountered in aircraft flight operations. This is true because the factor controlling the change of cabin absolute pressure during either ascent or descent of the aircraft is the change of altitude of the aircraft. Since commercial aircraft have so-called placard or limit speeds, descents cannot be made faster than the rate which will produce the limit speed and it is conventional airline practice to descend in accordance with equal increments of altitude per unit of time. Similarly on the ascent the relatively constant available power from modern supercharged engines within the normal flight range makes it reasonable to use the excess power over that needed in overcoming level flight gravitational lift and drag forces to increase the aircraft altitude in equal increments per unit of time. Thus the typical scheduled airline climb is one of constant flight speed and constant rate of altitude increase. And now since passenger pressure comfort in the cabin may be measured in terms of pressure change rates, it is clearly most desirable to control the absolute pressure within the cabin as a straight line function of the pressure altitude of the aircraft.

This invention also provides in a cabin pressure control system means for maintaining smooth automatic regulation of cabin pressure regardless of flow surges inadvertently imposed on the cabin ventilation system. These means actually anticipate the surges in the air delivered to the cabin and provide the necessary sensitivity to counteract and fully eliminate the adverse effects which would otherwise be highly detrimental to passenger comfort. Furthermore, cabin pressure schedule changes initiated by resetting the controls if and when desired may also impose flow variations at the discharge valve of the cabin. It is highly important that these surges be smoothly counteracted before they affect cabin comfort, and that follow-up action to the pressure controls be provided to prevent hunting. This invention includes means to stabilize the control and give follow-up action with the special feature of not changing the normal cabin pressure control value in so doing.

To obviate the necessity of the operator of the pressure controls being forced to refer to special tables or charts, the present invention provides a control-setting apparatus on the cabin pressure control system which at all times will furnish to the operator a simple visual picture of the simulated cabin altitude which may be expected at any flight altitude during progress of the schedule and also shows the lowest cabin altitude which can be maintained within capability limits of the structure and supercharger apparatus at any given flight altitude for the particular aircraft. This control setting apparatus also constitutes a means of setting the control schedule for any flight long before the flight is started and to set the ratio between changes in absolute cabin pressure to changes in pressure altitude of the aircraft to the slowest cabin pressure change rate feasible during any given pressure altitude change.

The control system of the present invention also includes means for automatically controlling the time rate of pressure change for the cabin. This means, although ordinarily automatically operable, can be so set as to permit full manual control to be assumed in emergencies or during unusual flight procedures as may, for example, be undertaken during test flights or weather disturbances. The time rate of pressure change control means is normally operable in the preferred embodiment of this invention at predetermined limits to supervise and veto any action instigated by normal operation or resetting of the ratio-to-flight control means or the control action of the means for limiting either the cabin differential pressure or the ratio between cabin and flight pressures which may tend to make the cabin pressure change rate exceed the predetermined limits. Although the rate of pressure change means is normally an overriding control it may be set to assume primary charge of the rate of cabin pressure change when desired.

The control system of the present invention also includes a control means which will limit the maximum cabin differential pressure to values determined by the safety limits of the structure of the particular aircraft in which the control is incorporated even though the ratio-to-flight or time rate of pressure change control means might tend to exceed these limits during flight operations at altitudes above levels initially expected.

To prevent overloading of the supercharger equipment or other air delivery means employed when flights are attempted at altitudes above those for which normal operation is intended, control means are also incorporated which will assume primary control of pressure within the cabin if a predetermined ratio of absolute pressure between the cabin and flight atmosphere tends to be exceeded and this control will limit the absolute pressure ratio to the predetermined maximum value.

Another object of the invention is to provide means to automatically depressurize the cabin at a comfortable pressure change rate in the case of an emergency landing at a field above that originally intended or in case of inadvertent or even intentional settings of the ratio-to-flight control means at pressure altitudes below the pressure altitude of the landing field. These means are also operable to obviate the pressurization of the cabin by such inadvertent settings while the aircraft is parked and so long as the aircraft is supported by the landing gear.

To prevent temperature of the air within the cabin from exceeding some predetermined temperature due to heating of the air by compression, temperature responsive means are incorporated in the system for automatically decreasing the pressure within the cabin when the temperature therein reaches the predetermined temperature. This thermo responsive means is subject to the time-rate-of-pressure-change control means in a similar manner to the means controlled by the landing gear thus preventing the pressure in the cabin from changing at a rate in excess of the rate imposed by the time-rate-of-pressure-change control means.

Other features and advantages of the present invention will be apparent from the following description taken in connection with the accompanying drawings, in which:

Figure 5 is a front view showing the dial face and hands of the regulator shown in Figure 2;

Figure 6 is a graphic plot of the pertinent pressure control relations between cabin pressure and flight pressure, the latter being represented as flight altitude;

Figure 7 is a view of the dial and front face of my time rate of change cabin pressure regulator shown schematically in the system of Figure 1;

Figure 8 is a sectional view partly in elevation of my time rate of change cabin pressure regulator shown schematically in the system of Figure 1;

Figure 1:
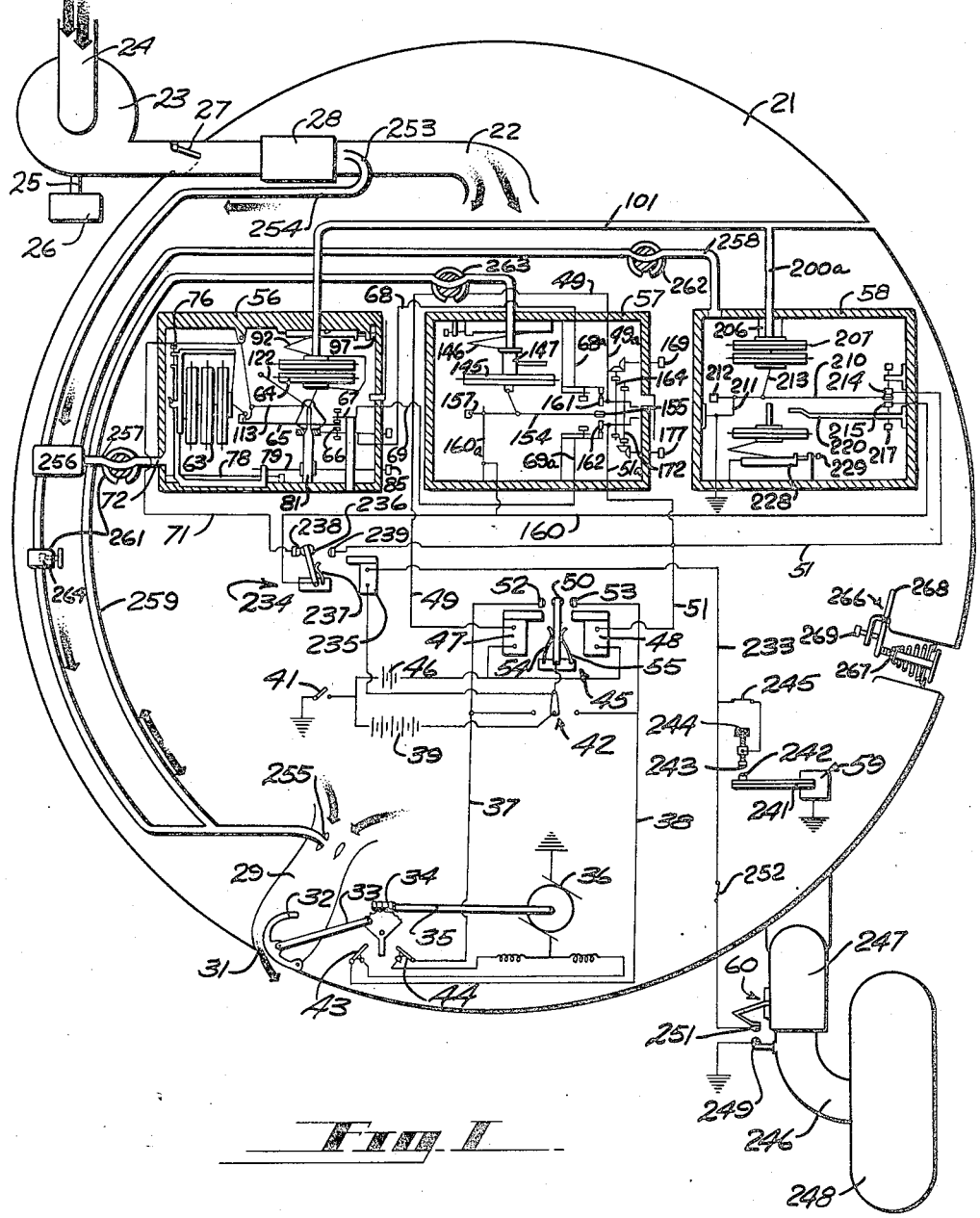
Figure 1 is a diagrammatic view showing the cabin pressure control system as applied to a typical aircraft cabin.

The control system of the present invention, referring now to the drawing and particularly Figure 1 thereof, is shown as controlling the pressure within a sealed aircraft cabin 21. Air is directed into the cabin through an air duct 22 arranged to deliver a flow of ventilation air to the cabin from a supercharging blower 23. The blower 23 is arranged to be supplied with air from a ram duct 24 and is driven through a shaft 25 by a speed controlled prime mover 26 in such manner that a substantially constant rate of ventilation air flow is supplied through the duct 22 to the cabin 21.

Although one cabin supercharging blower is shown for simplifying the illustration of the now preferred embodiment of the invention, it is obvious that dual blowers operating in parallel could be used.

A check valve 27 is mounted within duct 22 and is so formed that it is normally opened by the flow of air through the duct, but which will close and seal the duct to maintain cabin pressure in the event of failure of air flow in the duct 22.

If desired, some conventional temperature regulating means may be mounted within the duct to control the temperature of the incoming air to maintain the air supplied to the cabin at a comfortable temperature. The air temperature conditioner 28 may also include its own automatic temperature control means operated in response to thermostats or similar controls disposed within the cabin.

A discharge duct 29 leading to an outlet 31 in the cabin wall is provided for the discharge of air from the cabin. The outlet 31 is preferably located on the cabin wall in a region where the pressure along the wall is due to surface air velocities slightly less than that of the ambient atmosphere. Interposed in or as a part of the duct 29 is a valve 32 which in its various operating positions varies the outlet area and thus provides any desired throttling of cabin air discharged.

Since a substantially constant rate of air flow enters the cabin through the inlet duct 22, cabin pressure will be increased when the discharge valve 32 is closed or moved toward the closed position so that the air discharge is less than the air flowing into the cabin. On the other hand, if the valve is opened so that the air discharged is greater than the flow of incoming air, the pressure within the cabin will be decreased.

Although any means desired may be used to control the valve 32, in the illustrated embodiment of the invention the control of this valve is effected through an operating linkage 33, a worm gear 34 carried by a shaft 35, and a prime mover 36, which in the embodiment illustrated is shown as an electric motor of the reversible split field series type. Although for the purpose of illustrating the invention, the prime mover 36 has been shown as an electric motor, obviously hydraulic or pneumatic power could be substituted without departing from the scope of this invention. The linkage 33 is included in the valve drive in order to substantially relate the number of motor turns to change a given increment of cabin pressure over the full range of valve positions. The motor 36 may be energized either through a field coil circuit 37 or a field coil circuit 38 by power from some suitable source such as the battery 39 to open or close the valve 32, depending upon the direction of rotation of the motor.

A manually operable master switch 41 is interposed between the motor 36 and the battery 39 and controls the motor circuit. Directional control of the motor, and consequently the valve 32 may be effected by selected operation of a control switch 42. In the embodiment of the invention illustrated, movement of the switch arm into engagement with the left-hand contact as viewed in Figure 1 closes the valve and engagement of the arm with the right-hand contact opens the valve.

To prevent over-travel of the valve, limit switches 43 and 44 are connected into the field circuits of the motor 36. The limit switch 43 is adapted to open the field coil circuit 38 when the valve 32 reaches its fully open position, while the switch 44 will open the field coil circuit 37 when the valve reaches its fully closed position.

Some direct manual control for the valve 32, although not shown, may be added or substituted for the master control switch if so desired.

With the directional control switch 42 in its neutral position, as shown in Figure 1, automatic control of cabin pressure is effected through a control relay 45. Relay 45 as shown for illustrative purposes is essentially a power amplifier in which very small currents from a battery 46 through two relay field coils 47 and 48 can be activated by the control circuits 49 and 51 respectively, to bring about a flow of relatively large currents in the motor field circuits 37 and 38 respectively. Energization of the control circuit 49 and its associated coil 47 will cause the armature 50 of the relay 45 to move into engagement with a contact 52 in the field coil circuit 37 to energize the same. Energization of the field coil 37 causes the motor 36 to close the discharge valve 32 and similarly activation of the control circuit 51 will cause the armature 50 to move into engagement with the contact 53 and result in opening movement of the discharge valve 32.

The relay 45 is provided with two centering springs 54 and 55 which not only hold the armature 50 in the open position shown in which neither control circuit is activated, but also moves the armature into its neutral position whenever both control circuits are energized. Although a single spring loaded relay element is shown, dual relay elements in series may be substituted if desired in the amplifier system to produce this circuit-cancelling action. Amplification of the discharge valve power by means of variable low-range resistance, variable capacitance or variable inductance may also be substituted for the grounding type of control amplifier illustrated without departing from the scope of the invention.

It should be understood now that activation or grounding of the control circuit 49 will result in the discharge valve 32 moving toward its closed position to increase cabin pressure, and that grounding of the control circuit 51 will result in opening movement of the valve 32 to bring about a decrease in cabin pressure. Control circuit 49 may be activated by the action of either a ratio to flight cabin pressure regulator 56 or a time rate of change cabin pressure regulator 57. The control action of both regulators 56 and 57 is subject, however, as will be hereinafter more fully explained, to the overriding action of another primary regulator, a cabin pressure limits regulator indicated at 58 in Figure 1.

The control circuit 51 may be activated to call for decreased cabin pressure by any one of three primary regulators 56, 57 or 58, as well as a cabin overheating thermostat 59 or a landing gear switch 60. Specific transaction of each of these regulators and control elements will be discussed in turn.

Figure 2:
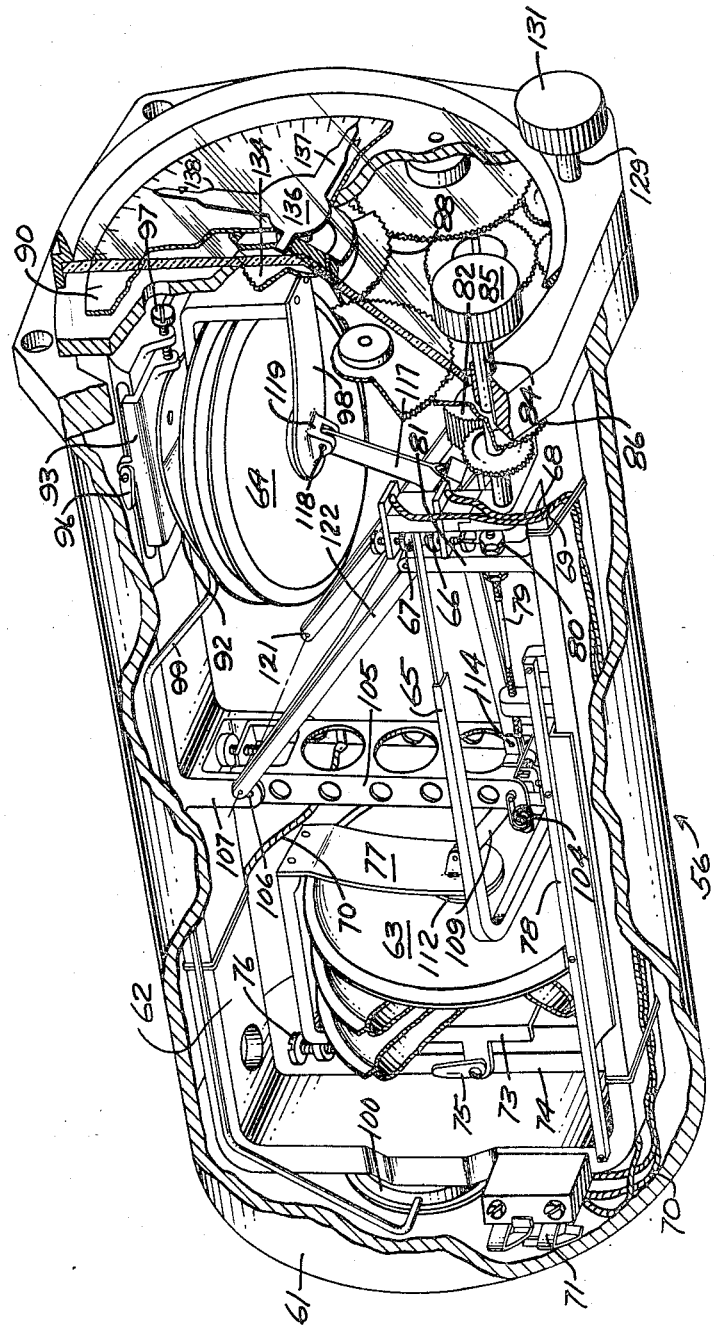
Figure 2 is a perspective view of the preferred embodiment of my ratio-to-flight pressure regulator with a portion of case broken away to more fully illustrate the same.
Figure 4:
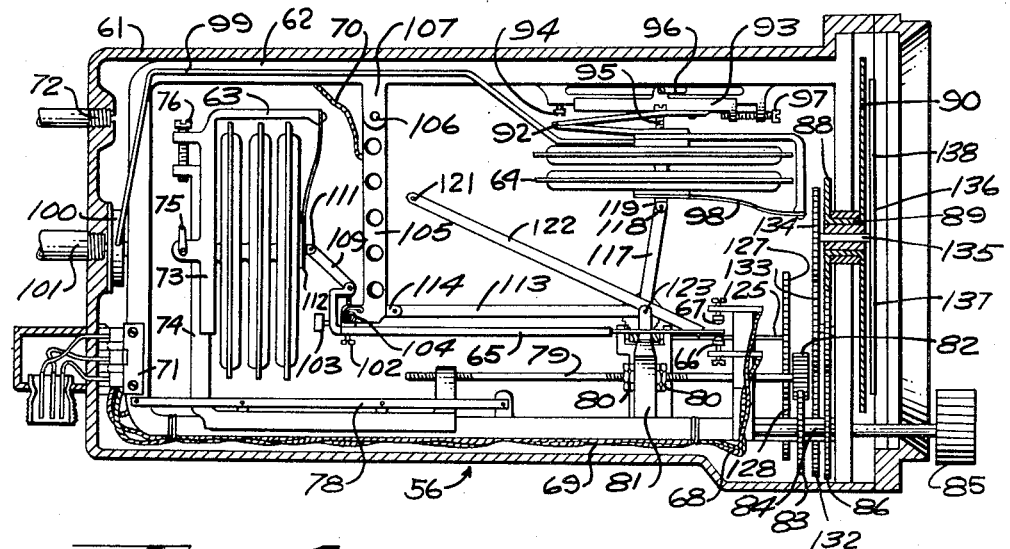
Figure 4 is a side view partly in section of the regulator shown in Figure 2.

The ratio to flight cabin pressure regulator 56 normally the most active of the primary regulators comprises, referring now to Figures 2 and 4, a sealed case 61 carrying a frame 62 on which is mounted an assembly of aneroid capsules 63 and an assembly of differential capsules 64. A control arm 65 is so pivotally mounted within the regulator that it is moved by the expansion or contraction of either or both the capsule assemblies 63 and 64. The one end of the arm 65 is interposed between a pressure increase control contact 66 and a pressure decrease control contact 67. The contact 66 is insulated from the case 61 and is connected to control circuit 49 by a lead 68. The contact 67 is also insulated from the case 61 and is connected to control circuit 51 by a lead 69. The control arm 65 is electrically grounded by means of a lead 70. The leads 68, 69 and 70 are connected to a suitable terminal socket 71 carried by the frame 62 and adapted to receive a conventional attachment cap when the instrument is mounted in the aircraft.

The control arm 65 is balanced between and separated from the contacts 66 and 67 by the capsule assemblies 63 and 64 whenever the pressure within the cabin corresponds to the control schedule of the regulator 56. If cabin pressure, admitted through aperture 72, is substantially greater or less than scheduled, control arm 65 engages pressure decrease contact 67 or pressure increase contact 66 respectively, and control valve 32 is moved to a new position to bring about the predetermined scheduled cabin pressure.

The aneroid assembly 63 is of the conventional jacketed and sealed element type, and is rigidly mounted at its base to a slide 73 which in turn is adjustably mounted on one leg of an intermediate slide member 74. Adjustment of slide 73 on the intermediate slide 74 may be accomplished by means of a slide clamp 75 and an adjusting screw 76. The aneroid assembly 63 is flexibly supported on its expandable end by a resilient support 77 attached to the slide 73. The intermediate slide 74 is slidably mounted on the frame 62 and is held in abutment therewith by a slide bar assembly 78. Adjustment of the position of the intermediate slide 74 on frame 62 may be made by a lead screw 79. Lead screw 79, threaded into the intermediate slide at one end as shown is supported and held in position coaxially by lock nuts 80 straddling a frame pillar 81. The lead screw carries a gear 82 at one end thereof and will be rotated when the gear 82 is rotated. The gear 82 engages a gear 83 on a dial setting shaft 84 also supported on the frame 82. The shaft 84 pierces the regulator case 61 through an air-tight seal and carries at the outer end thereof an adjusting knob 85.

Within the case 61 and also mounted on the shaft 84 is a drive gear 86 which drives through an idler gear a pinion 88 carried by the inner end of a short hollow shaft 89 journaled on the frame 62. Fixed to the outer end of the shaft 89 by any means desired is a dial 90 carrying a suitable scale. The position of the dial 90 with respect to any adjusted position of the intermediate slide 74 may be made by adjustment of the position of the lock nuts 80. It is therefore possible to set the zero position of dial 90 without interfering in any way with the desired adjustment of contacts 66 or 67.

The differential pressure capsule assembly 64 is of the conventional thin walled corrugated disc type and is rigidly mounted at its base to a plate 91 and an adjustable support ring 92. The support ring 92 is in turn mounted on a capsule slide 93. The position of differential capsule assembly 64 with respect to the slide 93 is made adjustable by screws 94 and 95 carried by the slide 93. The position of the slide 93 with respect to frame 62 can be varied by means of a sliding clamp 96 and adjustment screw 97. The capsule assembly 64 is flexibly supported on its expandable end by a spring support 98 attached to an integral finger of the base plate 91. A tube 99 leads from a fitting 100 carried within an aperture formed in the rear of the case 61 to the interior of the capsule assembly 64. The fitting receives the one end of a tube 101 which leads to the exterior of the aircraft so that the interior of the capsule assembly 64 is in communication with the flight atmosphere.

The control arm 65 comprises an elongate metallic member arranged to swing one end between the contacts 66 and 67 about either of the two independent but parallel hinge axes. The distance between these hinge axes is made adjustable by a spreader screw 102. Static balance of the control arm is made possible by an adjustable counterweight 103. The primary support for the control arm 65 is provided at one of the hinge axes by jeweled bearings 104 carried by the free end of an arm of an L-shaped support 105.

The support 105 is hinged at the opposite end by a pin 106 mounted in lugs 107 formed integral with the frame 62. The other hinge axis of the control arm 65, as best seen in Figures 3 and 4, is established by a pin 108 carried by one end of a link 109, the opposite end of which is pivotally connected by a pin 111 to a lug 112 carried by the expandable end of the aneroid assembly 63.

From the structure thus far described it will be noted that an expansion of the aneroid assembly 63 would tend to rotate the control arm 65 toward the contact 66 while a contraction of the aneroid assembly tends to cause rotation or movement toward contact 67. If L-shaped support 105 is held against movement, control as influenced by the contacts is accordingly such as to maintain a constant value of pressure within the regulator case.

Associated with control arm support 105 there is provided a means for obviating any action on control arm 65 because of expansion or contraction of the differential pressure capsule assembly 64, as well as for selecting any reasonable degree of action therefrom to combine with action from the capsule assembly 63.

Figure 3:
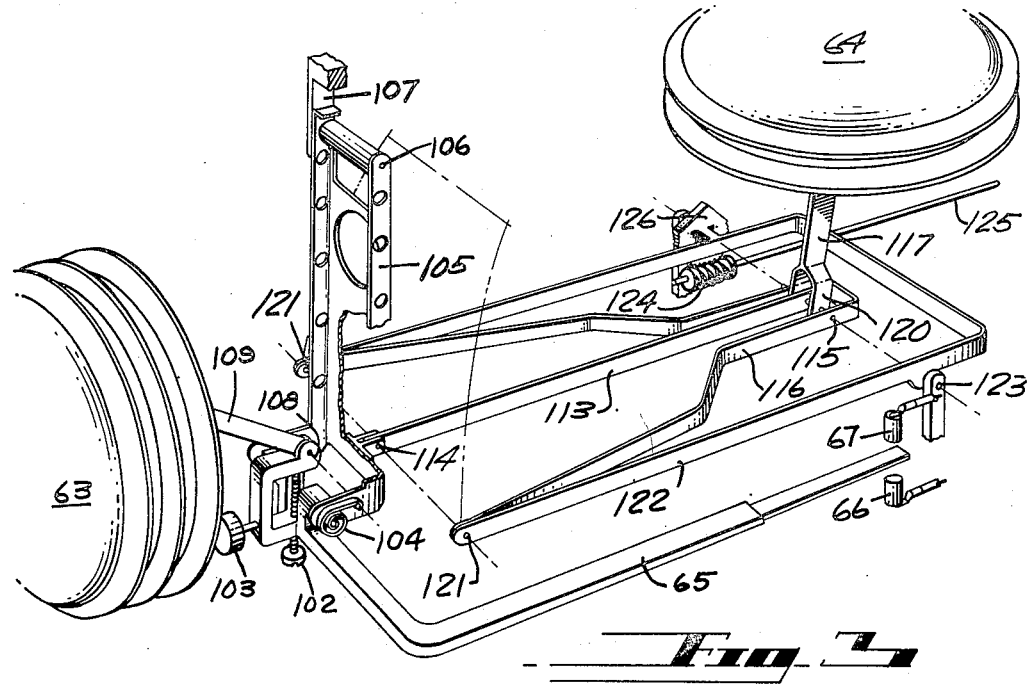
Figure 3 is a perspective view of the most important operating parts of my ratio to flight cabin pressure regulator shown in Figure 2.

The components of the now preferred embodiment of this means comprises, as best seen in Figure 3, a ratio control link 113 pivotally attached at one extremity by a pin 114 to the L-shaped support 105 and at the other end to an elongate pin 115. The opposite ends of the pin 115 are pivotally mounted in the arms of a yoke 116. A link 117 pivotally connected at one end by a pin 118 to a lug 119 carried by the capsule assembly 64 is formed at the opposite end with a bifurcated member 120 which stradles the end of the link 113, the legs of the bifurcated member being formed with aligned openings for rotatably passing the pin 115.

The free ends of the arms of the yoke 116 are connected by suitable pins 121 to the free ends of the arm of a U-shaped bracket 122, which in turn are connected adjacent the bow of the U to pivot pins 123 carried by the pillars 81 of the frame 62. The position of the U-shaped bracket may thus be adjusted about the axis of the pins 123, and this adjustment is preferably accomplished by means of a worm gear 124 carried by a shaft 125 and a sector gear 126 carried by the bracket 122 and mounted between the same and one of the pillars 81.

Fixed to the shaft 125, referring now to Figure 4, is a gear 127 which meshes with a second gear 128 carried by a shaft 129 supported on the frame 62. The shaft 129 pierces the regulator case 61 through an integral seal and carries at the outer end thereof an adjusting knob 131. A gear 132 mounted on the shaft 129 engages an idler gear 133 meshing with a pinion 134 carried by a stub shaft 135. This shaft is coaxially mounted relative to the shaft 89 and carries at the outer end thereof a circular disc 136 having integrally formed therewith a pair of hands 137 and 138. As the hands 137 and 138 are integrally formed with the disc 136, the angle between them is fixed and can be predetermined. The cooperation between the hands 137 and 138 and the dial 90 will be hereinafter more fully explained.

It should be noted now that all of the pivotal axes of the component elements of the regulator 56 as defined by bearings 104, pins 106, 108, 114, 111, 115, 118 and 123 are substantially parallel. The distance between centers of pins 114 and 115 is made equivalent in length to the difference between centers of pins 121 and 123. Furthermore, the axes of pins 123 are coincident with the axis of the elongate pin 115 whenever the differential pressure capsule assembly 64 is subjected to zero pressure difference between the interior and exterior of the cabin. Since the separation between the axes defined by the pins 114 and 115 is equivalent to that established by pins 121 and 123, an adjusted position of the U-shaped bracket 122 may be chosen for which the hinge center of axis of pins 121 is coincident with the axis of pin 114. When the bracket 122 is so positioned the path of movement of pin 115 created by a contraction of the capsule assembly 64 is concentric with pin 114 and control arm support 105 is substantially locked against movement regardless of the differential pressure and control arm 65 is then subject only to absolute pressure.

Now, if the bracket 122 is moved to a position as shown in Figure 2 or 4, as soon as any contraction of pressure capsule 64 occurs such as would occur if the pressure in flight pressure tube 99 were allowed to become less than the pressure in the case 61, then pin 115 tends to rotate around the new position of pin 121 and the link 113 will pull the support 105 toward the differential pressure capsule assembly, thus causing control arm 65 to rotate about pin 108 toward engagement with contact 67. The farther the control arm support bracket 122 is moved from the position shown in Figure 3 the greater the action of the differential pressure capsule assembly on the control arm. This function of the adjustment of the bracket 122 will be better understood after an overall description of the regulatory action of the system has been made.

The time rate of change cabin pressure regulator 57, referring now to Figure 8, comprises a sealed case 142 in which is mounted a supporting frame 143. A slide 144 mounted on the frame 143 is movable thereon for adjustably positioning a differential pressure capsule 145. The capsule 145 is attached to the slide 144 by means of an adjustable support ring 146 and a base spool 147. An adjustment screw 148 permits adjustment of the slide 144 and the capsule with respect to the frame 143. An adjustment screw 149 permits the capsule to be vertically adjusted, as viewed in Figure 8.

The interior of the spool 147 communicates directly with the interior of the capsule 145 and through tube 151 to a fitting 152 mounted in an aperture 153 formed in the case 142.

A control arm 154 carrying at one end thereof a contact 155 is pivotally mounted adjacent the opposite end thereof to a finger 156 integrally formed with the frame 143. To counterbalance the arm 154 a weight 157 having a tapped aperture therethrough is threadedly mounted to the one end of the arm. A link 158 pivotally interconnects control arm 154 and the expandable end of the capsule 145, the link being pivotally connected at one end to the arm and at the opposite end to a lug 159 carried by the capsule.

The control arm is electrically connected by a lead 160a to a circuit 160, the purpose of which will be hereinafter more fully explained. The control arm is so mounted within the instrument that the contact 155 is movable between a pressure increase contact 161 connected to control circuit 49 by a lead 49a and a pressure decrease contact 162 connected to control circuit 51 by a lead 51a. The contact 161 is mounted on an arm 163 formed with a threaded aperture receiving a threaded shaft 164 journaled in bearings 165 carried by the frame 143. Rotation of the shaft 164 and adjustment of the arm 163 and contact 161 is accomplished through a shaft 166 rotatably supported on the frame, and carrying at the inner end a gear 167 of a bevel gear set, the other gear 168 of which is carried by the upper end of the shaft 164.

The shaft 166 carries at the outer end thereof a knurled knob 169 to permit the shaft 166 to be rotated to bring about the desired adjustment of the contact 161.

The contact 162 is carried by an arm 171 similar to the arm 163 and formed with a threaded aperture for receiving a rotatably mounted threaded shaft 172 journaled in bearings 173 carried by the frame of the instrument. The lower end of the shaft 172 carries a bevel gear 174 engaging and meshing with a gear 175 carried by a shaft 176 rotatably mounted on the frame of the instrument. The shaft 176 also carries at the outer end a knurled knob 177 to permit the shaft 176 to be easily rotated to bring about any selected adjustment of the contact 162.

The shaft 166 carries a gear 178 which, through an idler gear 179, drives a pinion 181. The pinion 181 is carried by a hollow shaft 182 which passes through a dial 183 carried by the frame of the instrument and supports at the outer end thereof a hand or needle 184 which serves as an index means for the scale of the dial 183.

It should now be seen that manipulation of the knob 169 adjusts the position of the contact 161 and simultaneously sets the hand 184 to indicate the climb limit set by the adjusted position of the contact 161.

The shaft 176 carries a gear 185 which engages and drives an intermediate gear 186 which in turn meshes with and drives a pinion 187 carried by the inner end of a stub shaft 188 coaxially extending through the hollow shaft. The shaft 188 carries at the outer end thereof a hand or needle 189 movable over the dial 183. As will be understood, rotation of the shaft 176 through manipulation of the knob 177 simultaneously adjusts the position of the hand 189 and the contact 162 to provide a descent limit setting.

Insulated stops 191 are provided on inturned fingers of the arms 163 and 171 to limit movement of the contacts 161 and 162 toward each other and in the now preferred embodiment of the invention the two contacts can be brought together to a position in which they are separated a distance slightly greater than the thickness of the contact 155 carried by the control arm 154.

A capillary tube 193 leads from the interior of the case 142 to the interior of the hollow spool 147 which is in direct communication with the interior of the differential pressure capsule 145. Whenever pressure in the tube 193, spool 147, and pressure capsule 145 changes rapidly, a pressure difference is built up across the capsule 145 due to the restriction to air flow in the small passage of the capillary tube 193, and the control arm 154 is subjected to large angular deflection. Similarly, very slow changes in pressure differential across the capsule develops small angular deflections of the control arm 154.

In the illustrated embodiment of the present invention counterclockwise rotation of the control arm 154, as viewed in Figure 8, is brought about by decrease in the pressure of the air within the tube 151 and clockwise rotation of the arm is brought about by a pressure increase within the tube 151. In accordance with conventional practice in aircraft rate of climb instruments, the capillary tube 193 may be of or filled with a material which increases its restriction to air flow in accordance with reduced air densities so that whenever so desired compensation may be obtained to permit relatively larger deflections of the control arm 154 for a given pressure difference at high altitudes. When so compensated a given control arm deflection corresponds directly to a constant value of altitude change. Furthermore, temperature compensation may be provided as in present day aircraft rate of climb instruments by supplying an auxiliary gas filled diaphragm or a bi-metallic strip adjacent the pressure capsule 145.

The zero position of contact 161 is such that a very slight clearance is had between the same and the contact 155 when the control arm 154 is in zero pressure change position. A contact 194, carried at the free end of a spring arm 195 attached to a finger 196 integrally formed with the frame 143, is so held by the arm 195 relative to the contact 161 that for all positions of the latter from just beyond its zero adjustment position into the climb rate of control arm 154, engagement is maintained between contacts 161 and 194 by the resiliency of the spring arm 195. The contact 194 is electrically connected by a lead 68a to the circuit 68 through the resilient arm 195 and is thus electrically connected to control circuit 49.

However, upon adjustment of contact 161 to its zero position and into the descent range by proper manipulation of the knob 169 the engagement between contacts 161 and 194 is broken by a screw 197 adjustably mounted on a lug 198 integrally formed with the finger 196 and extending substantially normal thereto.

The zero position of contact 162 is such that a very slight clearance is had between the contact 155 when the control arm 154 is in the zero pressure change position. A contact 199, connected by leads 69a and 69 to circuit 51, is carried at the free end of a resilient finger 201 having the opposite end anchored to an arm 202 integrally formed with the frame 143 and projecting upwardly therefrom as viewed in Figure 8. The resilient finger 201 is so positioned that for all positions of contact 162 from just beyond its zero adjustment position into the descent range of control arm 154 engagement is maintained between contacts 162 and 199. Upon adjustment of the contact 162 to its zero position or anywhere into the climb range this engagement is broken by the screw 203 adjustably mounted in a lug 204 extending substantially normal from the finger 202.

Figure 10:
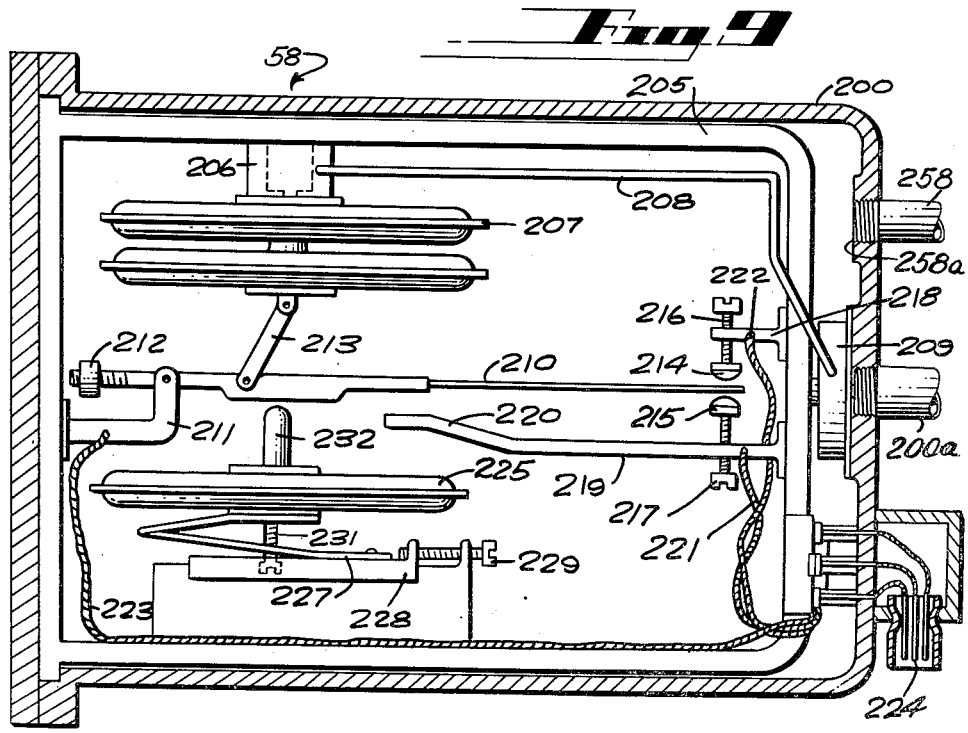
Figure 10 is a view similar to Figure 8 but showing my cabin pressure limits regulator shown schematically in the system of Figure 1.

The cabin pressure limits regulator 58, referring now to Figure 10, comprises a sealed case 200 of insulating material in which is formed a tapped aperture for receiving one end of a tube or conduit 200a leading to the tube 101. The case houses a suitable frame 205 on which is mounted a hollow spool 206. A differential pressure capsule assembly 207 is rigidly secured to the one end of the spool 206 and the interior of the latter directly communicates with the interior of the capsule assembly. A tube 208 leads from a fitting 209 in communication with conduit 200a to the interior of the spool 206 to the end that the interior of the capsule is subjected to flight pressure. A control arm 210 is pivotally mounted adjacent one end thereof to an L-shaped support 211 suitably supported by the frame 205. To counterbalance the arm 210 a weight 212 is threadedly mounted to the one end of the arm for movement longitudinally of the same.

The control arm 210 and the capsule assembly 207 are pivotally interconnected through a short link 213 the opposite ends of which are connected respectively to the capsule assembly and the control arm 210 through suitable pivot pins.

The position of control arm 210 is thus varied by expansion or contraction of the capsule assembly 207. The free end of the arm 210 is thus movable between a pair of contacts 214 and 215 carried by rods 216 and 217 respectively, adjustably carried by fingers 218 and 219 respectively, supported on the frame 205, and insulated therefrom. A bumper 220 formed by an extension of finger 219 limits the angular deflection of the control arm 210. The position of the contacts 214 and 215 can be selectively adjusted by rotation of the rods 216 and 217 through engagement of the tool receiving members carried at the one end of each of the rods.

The leads 221, 222, and 223 respectively, electrically connected to contacts 215 and 214 and the control arm 210, respectively are attached to a suitable lead-in receptacle 224 which takes an attachment cap (not shown) carrying contacts connected to circuits 160, 51 and a suitable grounding connection respectively.

Control arm 210 is held in engagement with ground circuit contact 215 whenever the pressure differential acting on differential pressure capsule assembly 207 is less than a predetermined value. If the acting pressure differential is greater than this limit value, control arm 210 first disengages from contact 215 opening the control circuits of regulators 56 and 57 and upon further increase in differential pressure moves into engagement with contact 214 which results in energization of control circuit 51 and therefore opening movement of the control valve 32 until the limit cabin pressure is no longer exceeded.

Cabin pressure limits regulator 58 is arranged furthermore to decrease the limiting differential pressure in accordance with a fixed limiting ratio of the absolute pressures existing across the pressure capsule assembly 207. This limiting ratio function is derived from the action of an aneroid 225 on differential pressure capsule 207. The aneroid capsule 225 is supported by a ring 227 carried by a slide 228 mounted on an enlarged portion of the frame 205. An adjustment screw 229 carried by an upstanding boss formed integral with the enlarged portion of the frame 205 permits the slide 228 and the aneroid 225 to be adjusted longitudinally of the frame 205. A second adjustment screw 231 permits axial adjustment of the fixed side of the aneroid 225 with respect to the slide 228. A post 232 carried by the expandable side of the aneroid capsule 225 is adapted to engage against the underside of the control arm 210 to augment the action of capsule 207 on the control arm whenever aneroid 225 expands more than a predetermined extent as a result of the reduction of cabin absolute pressure below a predetermined value. By adjustment of screws 229 and 231, the position of the aneroid can be selected which will bring about the desired cooperation between the same and the capsule assembly 207 to maintain a balance of control arm 210 between contacts 214 and 215 in accordance with a preselected ratio of the absolute cabin pressure to absolute flight pressure, that is a preselected cabin compression ratio whenever regulators 56 and 57 signal for control of the valve 32, which would result in a cabin compression ratio in excess of the value preselected. It will be seen that as long as control arm 210 is disposed between contacts 214 and 215, the cabin compression ratio will remain constant, but should the preselected compression ratio be exceeded, the action of capsules 207 and 225 will be sufficient to move the control arm 210 against contact 214, resulting in energization of control circuit 51 and opening movement of the valve to reduce absolute pressure within the cabin and consequently the cabin compression ratio.

Two associated control elements, namely, the cabin overheat thermostat 59 and the landing gear switch 60 are included in the cabin pressure control system as shown in Figure 1. Each of these elements is connected to a special valve opening control circuit 233, which when grounded energizes a ratio regulator cut-out relay 234. The relay 234 comprises, referring now to Figure 1, a field coil 235, an armature 236, a spring 237, and a pair of contacts 238 and 239. Contact 238 is electrically connected to ratio regulator ground lead 71 while contact 239 is connected to the control circuit 51. The armature carries a contact which is connected to the intermediate ground lead 160. The spring 237 normally maintains the contact carried by the armature in engagement with the contact 238 so that the regulator 56 is normally operative. However, when control circuit 233 is grounded as by the overheat thermostat 59 or the landing gear switch 60, the coil 235 of the relay 234 is energized and the contact of the armature 236 is moved into engagement between the contact carried by the armature 236 and the contact 239. The disengagement of these contacts breaks the grounding circuit for regulator 56 and energizes the valve opening control circuit 51, which, through the valve mechanism hereinbefore described, causes the valve to open, thus bringing about a reduction in cabin pressure or a decrease in the absolute value of pressure in the cabin. As may be noted from the circuit diagram of Figure 1, however, this valve opening action is still supervised by regulator 57 to limit the rate of pressure decrease in the cabin.

The overheat thermostat 59 mounted within the cabin and electrically grounded as shown in Figure 1 comprises a bi-metallic strip 241 carrying a contact 242 engageable with a contact 243. The strip is so formed that it will move contact 242 toward contact 243 upon increase of cabin temperature. Contact 243 is made adjustable in position by the screw 244 and is connected to control circuit 233 through a manually operable switch 245. By setting contact 243 to engage contact 242 at a particular upper tolerance limit of cabin temperature and with switch 245 closed, cabin differential pressure may be limited to a value which will prevent serious cabin temperature discomfort in favor of cabin pressure comfort, even though unreasonable schedules of cabin pressure control are attempted during extremely warm weather. A reduction of cabin temperature is normally associated with a reduction of cabin pressure since incoming air is heated by the supercharger somewhat in proportion to the cabin differential pressure. For most high altitude operations in normal or cold weather additional heat will be required to maintain a 70° F. temperature level even while flying with full cabin pressurization. This additional heat will be supplied by some form of heater, not shown, but associated with the air temperature conditioner 28 shown in Figure 1.

For extreme warm weather operations with no cooling facilities for the incoming air, cabin temperature may become excessive upon attempting extreme pressurization and then cabin overheat thermostat 59 may be made operative to automatically try to reduce cabin pressure to lower the cabin temperature below the set limit if ever this set limit is exceeded. With intercoolers and an expansion turbine refrigeration apparatus installed in air temperature conditioner 28 to cool the cabin to comfortable temperature during extremely warm weather, cabin overheat thermostat 59 automatically tries to lower the cabin pressure and, as a consequence, make available more of the supercharger power for refrigeration if ever the cabin temperature exceeds the set upper limit. The overheat thermostat may, for example, be set to 85 or 90° Fahrenheit.

Landing gear switch 60 is mounted on the landing gear of the aircraft and is electrically grounded as shown in Figure 1. The landing gear shown is of the conventional retractable design in current use on most all present day commercial aircraft. A hydraulic pneumatic shock strut 246 is movable in a cylinder housing 247 in such manner that the strut and a wheel 248 attached to this strut move upward under load as upon application of the aircraft weight against the ground in landing. In landing position the strut and wheel move downwardly with respect to the aircraft when the aircraft weight is lifted off the gear as occurs when the aircraft becomes airborne. The strut 246 is provided with a contact 249 which is electrically grounded. Cylinder housing 247 carries a contact 251 which is so spaced from contact 249 as to engage it only when weight of the aircraft is on the landing gear. A normally closed manually operated switch 252 permits the landing gear switch to be removed from the system if desired, as when testing the sytem with the aircraft on the ground.

Inadvertent settings of regulators 56 or 57 to cabin altitudes below those of the level of the landing field are thus prevented from either causing cabin pressurization prior to flight, even though the system is otherwise made operative, or from maintaining cabin pressure once the aircraft lands.

Cabin pressure apertures 72, 152 and 258a of regulators 56, 57 and 58 respectively, are communicated to cabin pressure through an anticipator system in order to render these control elements extremely sensitive to transient changes in pressure during cabin pressure operation. By this system trends of cabin pressure and potential surges in cabin pressure are made reactive upon the regulators prior to any appreciable change in the cabin pressure. The anticipator system per se forms no part of the present invention and is disclosed and claimed in United States Patents Nos. 2,407,257 and 2,407,258 issued from my copending applications, Serial Numbers 429,901 and 446,039. For this reason, only those details of the anticipator system as are necessary to a full understanding of the present invention will be described herein.

This system, referring now to Figure 1, comprises a low capacity air flow circuit arranged in parallel with the cabin ventilation circuit. In the anticipator circuit air enters the Pitot tube 253 pointed upstream in duct 22, passes through a conduit 254, and discharges into a venturi 255 located in the upper duct 29. The pressure in Pitot tube 253 is slightly higher than cabin pressure by the amount of ram and pressure drop from this position in duct 22 to the cabin. The pressure in venturi 255 is slightly less than cabin pressure by the amount of Venturi suction and pressure drop to this position in duct 29 from the cabin. A small casing 256 is interconnected into the conduit 254 at a substantially mid-point therein. The pressure within the casing 256 is substantially equivalent to cabin pressure whenever stabilized and equivalent air flows are passing into and out of the cabin. Conduits 257 and 258 leading from regulators 56 and 58 respectively, are connected into the casing 256 so that the interiors of the instruments are subject to pressure variations in the anticipator system. At a point in conduit 254 adjacent the venturi 255 wherein the pressure is less than cabin pressure and very nearly equal to the pressure venturi 255, a conduit 259 leading to the pressure responsive element of regulator 57 is connected into the conduit 254.

The cases of either or both the regulators 56 and 58 as well as the pressure responsive element of regulator 57 may be made directly responsive to the cabin pressure rather than to the pressure in the anticipator system, if at any time it is so desired, by suitable operation of plug valves 261, 262 and 263, respectively.

An adjustable restrictor valve 264 is provided in conduit 254 in order that the non-transient or normal static pressure at the medial position in conduit 254 may be readjusted manually to equal cabin pressure even though minor variations are more permanently made in the effective pressure drop through duct 22 downstream of the Pitot 253 as may be effected by ventilation distribution adjustment, or upon any minor change in the pressure drop in duct 29 upstream of venturi 255 as may be effected by changes in leakage through the seams of the cabin. A relatively small structural seam leakage is to be expected and it is further to be expected that this small leakage will increase somewhat during the life of the aircraft.

The regulators 56 and 58 are connected into the anticipator system at the substantially neutral midway point as hereinbefore brought out because these regulators require close control of an absolute cabin pressure and are preferably made sensitive to that exact pressure at the same time obtaining equal response to changes in cabin in-flow and out-flow. However, regulator 57 is preferably connected to the anticipator circuit at a point closely adjacent to the venturi 255 in order that an even greater speed of response is attained with respect to change in cabin out-flow as controlled by valve 32 than is attained with respect to change in the flow of air into the cabin.

As a safety feature for protection of the structure of the airplane cabin in case of emergency, a relief valve 266 is furnished on the cabin wall as shown in Figure 1. The setting of this simple spring-loaded valve is adjusted by means of adjustment nut 267 to a value above that limited by pressure limits regulator 58. A handle 268 is provided to permit normal operation of the valve to keep it free and to check it for freedom. A lead screw 269 is mounted adjacent the handle to hold the valve open if so desired in emergency.

Ratio to flight cabin pressure regulator 56 presents a dial and hands arrangement to the operator as shown in Figure 5. The dial 90 is arranged for rotation concentric with the disc 136 carrying the hands 137 and 138. Numbers representing standard pressure altitudes are so marked on the dial 90 that the difference between the standard pressures corresponding to any two altitude readings indicated thereon by the hands 137 and 138 is exactly equal to the predetermined limiting differential pressure for the airplane cabin at the altitude indicated. Hand 137 is labeled as showing ratio limit flight altitude and hand 138 is labeled as showing ratio limit cabin altitude. A fixed indicator 271 is mounted at the top of the face to mark a pressurizing altitude setting as read on dial 90. Some desired index marks such as shown at 272 on indicator 271 and hand 138 can be used to indicate the range of cabin pressure change which may be expected while flight is varied between altitudes indicated by the index marks 273 carried by the indicator 271 and hand 137.

Time rate of change cabin pressure regulator 57 presents a dial and hands arrangement to the operator as shown in Figure 7. Pressure change rate setting for limiting cabin climb is indicated by needle 184 over the markings on dial 183 while pressure change rate setting for limiting cabin descent is indicated by needle 189.

Control of cabin pressure as regulated by my cabin pressure control system herein described is intended to always be limited by regulator 58 within a maximum predetermined differential pressure which is the safe maximum for the cabin structure, and within a maximum predetermined compression ratio which is the safe and attainable maximum for the cabin pressure air supply superchargers. Typical values for such limits are 8.5 inches of mercury differential pressure and 1.75 compression ratio. This differential pressure represents an 8000 foot effective cabin altitude at 20,000 feet flight pressure altitude and the 1.75 compression ratio represents an effective 11,300 foot altitude at 25,000 feet flight pressure altitude.

There is shown in Figure 6 graphic illustrations of pressures which are limited by regulator 58 as well as the control functions of ratio to flight cabin pressure regulator 56. The pressure of the standard atmosphere as a function of flight altitude is indicated by the curve 275 and so labeled. Flight altitude is scaled in thousands of feet along the abscissa and pressure is scaled in inches of mercury absolute along the ordinate of the graph. The limit cabin differential pressure of 8.5 p. s. i. with respect to the atmospheric pressure is shown by the curve 276. Note that the vertical or ordinate distance between this curve and the atmospheric pressure curve is a constant fixed quantity for all flight altitudes. The limit cabin compression ratio of 1.75 is shown by the curve 277 and is so labeled. It should be noted that the total ordinate of this curve is a fixed multiple of the ordinate for the atmospheric pressure curve of any flight altitude. Also note that the limit curves so chosen in this example case intersect at an altitude of 25,000 feet. Below 25,000 feet maximum differential pressure is made the limit condition but above 25,000 feet the compression ratio becomes the limitation. To produce this control limitation, post 232 on the expandable side of aneroid 225 in pressure limits regulator 58 as shown in Figure 10 must, for the above control settings, remain disengaged from control arm 210 until 25,000 feet is attained and must become engaged at all altitudes above 25,000 feet with such force as to reduce the differential pressure acting on differential pressure capsule 207 in accordance with the pressure indicated by the difference in ordinates of the compression ratio curve and the atmospheric pressure curve 275 of Figure 6.

Connecting the atmospheric pressure curve 275 and the cabin differential pressure curve 276 in Figure 6, there is a horizontal pressure control curve A. This curve intersects the atmospheric curve at 2,000 feet altitude and intersects the cabin differential pressure curve at 11,600 feet altitude. Control curve A represents a schedule of cabin pressure during transition of flight altitude from 2,000 feet to 11,600 feet and for this schedule cabin pressure is seen to remain constant at a value of 27.82 inches of mercury absolute during flight between these altitudes. Curve A can furthermore be considered as one component of an overall cabin pressure schedule for aircraft flights from below 2,000 feet to well above 30,000 feet. For such a schedule, cabin pressure would remain equal to atmospheric pressure during flight up to 2,000 feet as represented by the atmospheric pressure curve 275. During flight between 2,000 feet and 11,600 feet, the cabin altitude would remain substantially constant at 2,000 feet as represented by curve A. For flight from 11,600 feet to 25,000 feet the cabin differential pressure would remain constant at 8.5 inches of mercury as represented by the differential pressure curve 276.

Above 25,000 feet the cabin pressure would be controlled at a fixed ratio of 1.75 times the pressure of the ambient atmosphere as represented by the compression ratio limit curve 277. This control schedule can be accomplished with the cabin pressure control system shown in Figure 1, first by setting the dial 99 of ratio to flight cabin pressure regulator 56 to a "pressurizing" altitude of 2,000 feet, this setting being shown in Figure 5. Next, time rate of change cabin pressure regulator 57 is to be set to reasonable rate comfort limits, for example, with hand 184 at 600 feet per minute climb and with hand 189 at 400 feet per minute descent as shown in Figure 7. With switches 41 and 42 in closed positions as shown in Figure 1, the above schedule is now operative. The bracket 122 in regulator 56 will for this schedule line up in the horizontal zero position shown for it in Figure 3. For flight altitudes below 2,000 feet, aneroid capsule 63 in regulator 56 will remain sufficiently collapsed to hold the control arm 65 against contact 67, thereby closing valve opening circuit 51 which results in control valve 32 being open but stationary as a result of the open position of limit switch 43. As the pressurizing altitude of 2,000 feet is reached, aneroid capsule 63 has expanded sufficiently to balance control arm 65 between contacts 66 and 67. As further ascent is made, aneroid capsule 63 expands, engaging control arm 65 with contact 66, thereby energizing valve closing circuit 49 to the end that the valve 32 moves toward a closed position such that cabin absolute pressure is increased sufficiently to collapse the aneroid capsule back to a position of contact balance. A 2,000 foot cabin altitude is thus maintained.

The scheduled pressure limits are maintained above 11,600 feet flight altitude by regulator 58 as described heretofore. If a 600 foot per minute rate of cabin climb is not exceeded during ascent, and if a 400 foot per minute rate of cabin descent is not exceeded during descent, regulator 57 will remain inoperative in the system. If these rate limits are exceeded, rate of pressure change regulator 57 will, by means of control arm 154, actuate valve closing circuit 49 in opposition to valve opening circuit 51 or vice versa, thereby opening the control of motor 36 from relay 45 and stopping all action on valve 32 until cabin pressure change rates stabilize within these limits.

It will be seen, referring again to Figure 6, that a number of schedules possible with the system of the present invention in addition to that represented by curve A, have been plotted thereon.

Control of cabin pressure in accordance with a schedule along any of sloping curves such as control curves $B^1$, $C^1$, $D^1$, $E^1$, $F^1$ can be represented by a fractional ratio. An ordinary ratio to flight control would be represented by the following ratio:

$$\frac{(P) - \text{(cabin absolute pressure)}}{(P) - \text{(flight absolute pressure)}} = k_1$$

where P is the flight absolute pressure at the pressure altitude at which pressurization of the cabin is to begin, and $k_1$ is a predetermined constant which for example may have a useful range from 0 to .6. In the latter case this would be equivalent to saying that the descrease in cabin pressure above a predetermined pressurizing altitude will be .6 times the decrease in flight altitude pressure above this same predetermined point. If regulator 56 were to consist of two coacting aneroid units, one sensitive to cabin pressure and one sensitive to flight pressure, then the above expression for the ratio control would be clearly applicable. However, since regulator 56 comprises an aneroid sensitive to cabin pressure and a differential pressure capsule exposed to the difference between cabin pressure and flight pressure, the above expression may be more clearly applied in the form:

$$\frac{(P) - (\text{cabin absolute pressure})}{(\text{cabin absolute pressure}) - (\text{flight absolute pressure})} = k_2$$

where P is the flight absolute pressure at the pressure altitude at which pressurization of the cabin is to begin, and $k_2$ is a predetermined constant which for example may have a useful range from 0 to 1.5. The expression for $k_1$ and $k_2$ define identical schedules of cabin pressure in that they each represent a straight line when plotted on a graph of cabin pressure as one ordinate and flight pressure as the other ordinate. In Figure 6, the form of cabin pressure control in which the change of cabin pressure is a direct ratio to the change of flight pressure is represented by the sloping curved dotted lines. The sloping curves, although straight when plotted on a graph of cabin pressure as one ordinate and flight pressure as the other ordinate are not straight when plotted as in Figure 6 but are bent with a greater slope at lower altitudes than at higher altitudes due to the form of the coordinate plot of the abscissa and ordinate in Figure 6. The solid straight curves in Figure 6 however represent ratio to flight pressure control in which the change of cabin pressure is a direct ratio to the change in flight altitude and not flight pressure. This control is a considerable improvement over the form of the control represented by sloping curves since during the operation of aircraft climbs and descents are normally gauged by instruments which read in terms of altitude. Thus, for the greatest cabin comfort to passengers, the change of cabin pressure should be controlled at a minimum rate in relation to the pressure altitude variation of the aircraft and not its flight pressure variation. This type of control can be best defined by its straight line relationship in Figure 6 but can also be expressed:

$$\frac{(P) - (\text{cabin absolute pressure})}{(\text{flight altitude}) - (\text{pressurizing altitude})} = k_3$$

where P is the flight absolute pressure at the pressure altitude at which pressurization of the cabin is to begin, and $k_3$ is a predetermined constant. If pressures are expressed in inches of mercury and altitudes are expressed in thousands of feet the useful range of this ratio $k_3$ is from 0 to about .00007.

The equations for $k_1$ and $k_2$ represent a ratio to flight pressure control which can be defined as a straight line on a graphic plot of cabin pressure as a function of flight pressure. The equation for $k_3$ represents a ratio to flight pressure control which can be defined as a straight line on a graphic plot of cabin pressure as a function of flight altitudes. Two other forms of ratio control are similar to the two previously mentioned but as should now be understood are far less desirable. These are, first, one which plots a straight line for cabin altitude varying as a function of flight altitude, and secondly, one which plots a straight line for cabin altitude varying as a function of flight pressure.

The straight curves are then preferred control schedules to that shown by the sloping curves. However, since the fractional expression for the ratio $k_1$ in the sloping curves is simple to express, this general ratio notation will be used for the ratio to altitude curves. For example, as shown by the table in Figure 6, the simplified approximate value of the ratio for curve B is ¼ or .25. Its exact value would have to be expressed by $k_3$.

Control curve B represents a schedule of cabin pressure during transition of flight altitude from 2,000 feet to 15,500 feet and for this schedule, cabin pressure is seen to vary from a value of 27.82 inches of mercury absolute (2,000 feet altitude) to a value of 24.98 inches of mercury absolute (4,900 feet altitude) during flight from 2,000 feet to 15,500 feet.

This cabin pressure control schedule can be accomplished with the cabin pressure control system shown in Figure 1, first by setting the dial 90 of ratio to flight cabin pressure regulator 56 to 2,000 feet. Next the ratio limit flight altitude hand 137 is to be set to 15,500 feet. The ratio limit cabin altitude hand 138 will then automaticaly read 4,900 feet. The time rate of change cabin pressure regulator 57 may be set as in the previous example to limits similar to those shown in Figure 7. This control schedule including curve B is now operative.

Other typical ratio control schedules possible with the system of the present invention are indicated by control curves C, D, E, and F in Figure 6. The curves show the desired straight line form of control as plotted thereon. For curves A and C the pressurizing altitudes are 2,000 feet, the ratio limit flight altitudes are 11,600 and 25,200 feet, respectively, and the net or average control ratios are 0 and ½, respectively. For curves D, E and F the pressurizing altitude is 6,000 feet, the ratio limit flight altitudes are 17,300, 22,000, and 28,500, respectively, and the net or average control ratios are again 0, ¼ and ½, respectively. The approximate average ratios are marked around the outer rim of the face of regulator 56 as shown in Figure 5. An arrow 279 on the disc 136 indicates the average ratio reading as determined by adjustment of the hand 137 of the regulator.

For control along curves A or D of Figure 6, the position of the U-shaped bracket 122 and regulator 56 is moved through adjustment of the knob 76 to a position substantially parallel to control link 113 as best seen in Figure 3. For control along curves B or E an intermediate angular position of the bracket 122 approximately as shown in Figure 4 is to be used. For control along curves C or F a larger angle of this bracket with respect to control link 113 is to be used.

Action of aneroid assembly 63 and differential pressure capsule assembly 64 is directly related to pressure changes, not altitude functions, so that when regulator 56 is set for ratio control, the ratio schedules would normally be in accordance with the ratio curves shown in broken lines and identified in Figure 6 as $B^1$, $C^1$, $E^1$ and $F_1$. The slope of each of the curves $B_1$, $C_1$, $E_1$ and $F_1$ is greater than the slope of the straight line curves B, C, E and F in the low altitude range of each curve where cabin differential pressure is low, and the slope is greater in the higher altitude range where higher cabin differential pressures exist. Regulator 56, however, includes means for so adjusting the control arm linkage from the differential pressure capsule that action of the ratio producing or slope producing elements is decreased at low differential pressures, and is increased at higher differential pressures. Thus the ratio control curves shown in broken lines are in effect bent to the straight line slope of the curves B, C, E and F.

This adjustment is made by moving differential pressure capsule assembly 64 to the right as viewed in Figure 4 along the slide 93 to a position in which link 117 subtends a substantial angle from the vertical. If the link 117 is moved to a position in which the angle is within the range of 35 to 50° and the length of the link 117 is relatively short, the necesary geometric arrangement is had to modify the ratio control curves to the solid curves desired. It will be seen that differential pressure capsule assembly 64 contracts substantially vertically under the influence of increasing differential pressure. During its contraction in the low differential pressure range, it will cause pin 115 to rotate about pins 121 at a relatively slow rate due to the large angle between link 117 and the direction of capsule movement. However, as higher differential pressure is reached, link 117 moves toward the vertical or in the path of capsule motion and a greater rate of rotation of pin 115 about pins 121 is obtained thereby increasing the slope of the ratio control curve as desired.

Thus, for example, for the schedule represented by the curve B, as 2,000 feet ambient altitude is reached, aneroid capsule 63 will have expanded sufficiently to balance control arm 65 between contacts 66 and 67. As further ascent is made, aneroid capsule 63 expands and moves control arm 65 into engagement with contact 66 to close circuit 49, which as should now be understood results in closing movement of valve 32 to a position such that a differential of cabin pressure above ambient pressure is built up, and since cabin absolute pressure is thereby increased, the aneroid 63 starts to collapse back to an equilibrium position. Now, however, the contraction of capsule 64, under the influence of the differential pressure acting thereon, rotates the yoke 116 counter-clockwise about pins 121, pulls control arm support and control link 113 to the right and moves control arm 65 toward contact 67. As the support bracket 122 in this schedule will have been adjusted to a position approximately as shown in Figure 4, the combined action of aneroid capsule 63 and differential capsule 64 on control arm 65 is such as to balance it between contacts thereby satisfying the control curve B.

It may be noted in Figure 6 that control curve F connects the atmospheric pressure curve to the compression ratio limit curve without limitation or intersection by the differential pressure limit curve. This simply means that the compression ratio limit is reached before reaching the maximum differential pressure limit. The ratio limit flight altitude reading furnished by the hand 137 of the regulator 56 still indicates the correct limit reading, however, since the peripheral altitude markings on dial 90 are spaced so that a fixed angle represents a fixed pressure difference in the range from 0 to the compression ratio limit intersection (which is 25,000 feet in the example shown) and are spaced so that a fixed angle from any altitude marking below this intersection altitude to any marking above this intersection altitude represents a fixed compression ratio. On the dial 90 the space between altitude markings is thus shown to progressively decrease from 0 to 25,000 feet, after which the unit spacing is magnified and again progressively decreases.

Operation of the cabin pressure control system shown in Figure 1 has been explained for control with ratio to flight schedules. For these schedules, time rate of pressure change regulator 57 was used only as a veto device to prevent the occurrence of uncomfortable rates of pressure change during resetting of ratio to flight regulator 56 on the link. Now another type of control can be accomplished with this control system, namely, time rate of pressure change control in which operation regulator 57 becomes the primary controller, and regulator 56 merely stops the controller cabin climb on descent at a set altitude. Pressure limits regulator 58 always maintains control over the extreme limit pressures.

Figure 9:
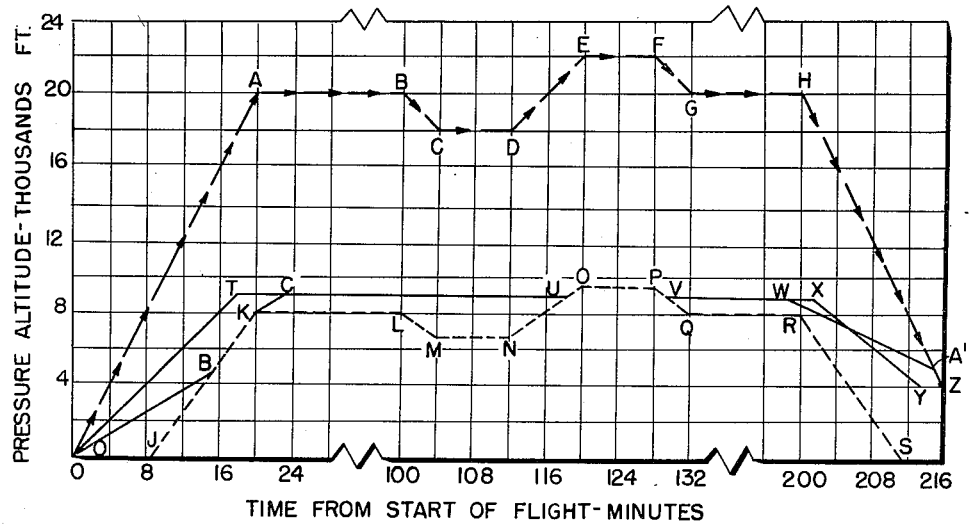
Figure 9 is a graphic plot of flight altitude versus time for typical control operations using time rate of change pressure control in direct response to the regulator elements shown in Figure 8.

Referring now to Figure 9, there are plotted some typical flight and cabin pressure schedules during the operation of time rate of pressure change control. The ordinate of this graph is scaled in thousands of feet of altitude and the abscissa is scaled in minutes of flight duration. Curve OABCDEFGHZ represents a typical flight starting at sea level, point 0, climbing to 20,000 feet at the rate of 1,000 feet per minute, maintaining level flight for 80 minutes, descending to 18 000 feet at a rate of 500 feet per minute, maintaining level flight for 8 minutes, climbing to 22,000 feet at 500 feet per minute, maintaining level flight for 68 minutes, and finally descending to airport Z at 4,000 feet at the rate of 1,000 feet per minute. The lower limit of cabin altitude dictated during this flight by the example value of 8.5 inches of mercury peak cabin differential pressure is shown by the curve JKLMNOPQRS. Now by setting both hands 184 and 189 of regulator 57 to the 500 feet per minute climb mark, a cabin climb along a curve OT may be accomplished. To prevent the cabin from continuing to climb right on up to the flight altitude it may be stopped at the 9,000 foot level indicated by curve TU by setting regulator 56 to zero ratio and to 9,000 feet pressurizing altitude. The connection of valve opening circuit 49 to regulator 56 is automatically broken by the separation of contacts 162 and 199 in regulator 57 when both indicators are set to a climb value. The valve closing circuit from regulator 56 is still active, however, so that the 9,000 limit altitude will be held after the cabin pressure has been reduced to the corresponding value. If a 300 feet per minute climb setting for both hands of regulator 57 had been chosen the climb schedule would be in accordance with curve $OB^1KC^1$, the set rate of climb being interrupted from $B^1$ to K by the action of pressure limits regulator 58.

Curve TU once obtained in the cabin pressure control schedule may be maintained by the setting above or may be maintained by two alternate procedures, the first of which is to set the time rate of pressure change hands to zero, or secondly to set hand 184 anywhere in the climb range and hand 189 anywhere in the descent range thereby allowing regulator 56 to maintain the 9,000 feet cabin altitude. At point U on this curve, pressure limits regulator 58 would take over continuing through UOPV.

A time rate of pressure change control of descent may be started at a point W or X, for example, on curve VX. If both hands of regulator 57 are set to 250 feet per minute descent at point W and if regulator 56 is set to an equalizing altitude of 4,000 feet or lower, the cabin will descend in accordance with curve WA¹. If both hands of regulator 57 are set to 400 feet per minute descent at point X, and if regulator 56 is set to a pressurizing altitude of 4,000 feet and to zero ratio, then the cabin will descend in accordance with curves XY and YZ. The altitude limit action of regulator 56 is accomplished as a result of automatic separation of contacts 161 and 194 in regulator 57 at the time that hand 184 is set into the descent range, so that only the valve opening circuit 51 is active during the descent.

Operation of the control system in Figure 1 on a time rate of pressure change schedule is generally less desirable than operation on a ratio to flight schedule. The reasons are obvious for, as pointed out hereinbefore, several different settings of time rate of pressure change regulator must be made at specific times during the flight. This is often inconvenient and a burden to the flight engineer or other operator. The continuous setting and resetting at times may cause unnecessary discomfort to the passengers and the failure to remember to start the cabin down at the correct time unnecessarily complicates the change of cabin pressure. For example, in Figure 9, descent of the cabin cannot be started much before point W or the differential pressure limit will interrupt it. If the start of cabin descent is delayed 6 or 8 minutes, then a much more abrupt descent must be made or else the cabin will become equalized with flight pressure during the descent and a higher rate of descent will automatically be imposed.

It is furthermore difficult to ascertain the exact time that the airplane's flight will reach a predetermined altitude. On the other hand, with ratio to flight control the regulator settings may very often never have to be changed throughout the flight and in cases where airports of departure and destination differ greatly in altitude, regulator settings can be changed to meet the most comfortable schedule any time prior to the start of descent. Descent of the cabin in ratio to flight control automatically starts when the airplane begins to descend. However, there are times when a fast descent of limited extent may be necessary through an opening in the overcast. For this and other similar occasional conditions it is important and desirable that the time rate of pressure change control be readily available with convenient means of making it operative over the ratio to flight type of control.

Although the now preferred embodiment of the invention has been shown and described herein, it is to be understood that the invention is not to be limited thereto for the invention is susceptible to changes in form and detail within the scope of the appended claims.

I claim:

1. An aircraft compartment pressure control comprising: means for delivering air to said compartment under a pressure greater than ambient flight pressure; means for discharging air from said compartment; means for varying the rate of air discharge from said compartment relative to the rate of air delivery to said compartment whereby the absolute pressure within said compartment may be varied; means, including a first capsule subject to cabin absolute pressure and a second capsule subject to cabin differential pressure coacting through an interconnecting linkage system, made operative upon said aircraft reaching a predetermined pressure altitude for controlling said last-named means for regulating the absolute pressure in said compartment in such a manner as to change said pressure in inverse straight-line proportion to changes in pressure altitude of said aircraft above said preselected pressure altitude; and means for preselecting the pressure altitude at which said controlling means is made operative; said preselecting means being changeable during flight of said aircraft and operable independently of said control means whereby said pressure altitude at which said control means is made operative may be altered during flight of said aircraft without altering the said proportion.

2. An aircraft compartment pressure control comprising: means for delivering air to said compartment under a pressure greater than ambient flight pressure; means for discharging air from said compartment; means for varying the rate of air discharge from said compartment relative to the rate of air delivery to said compartment whereby the absolute pressure within said compartment may be varied; control means, including a first capsule subject to cabin absolute pressure and a second capsule subject to cabin differential pressure coacting through an interconnecting linkage system, made operative by said aircraft reaching a preselected pressure altitude for operating said last-named means to maintain the absolute pressure within said compartment at a value above the ambient pressure at all practical flight altitudes within the operating limits of said control, said control means regulating the absolute pressure in such a manner as to change said pressure in inverse straight-line proportion to changes in the pressure altitude of said aircraft above the preselected pressure altitude; means for preselecting the pressure altitude at which said control means is made operative; and means for altering the proportion, said altering means being operative independently of said preselecting means whereby said proportion may be altered during flight of said aircraft without altering the preselected pressure altitude at which said regulating means is made operative.

3. An aircraft compartment pressure control comprising: means for delivering air to said compartment under a pressure greater than ambient flight pressure; means for discharging air from said compartment; means for varying the rate of air discharge from said compartment relative to the rate of air delivery to said compartment whereby the absolute pressure within said cabin may be varied; means, including a first capsule subject to cabin absolute pressure and a second capsule subject to cabin differential pressure coacting through an interconnecting linkage system, for controlling said last-named means in such manner as to change the absolute pressure in said compartment in inverse straight-line proportion to changes in flight pressure altitude; means made operative by a preselected rate of cabin absolute pressure change for controlling said varying means for inhibiting the time rate of change of said cabin absolute pressure during changes of altitude of said aircraft which, through operation of said first control means, produce a rate of cabin pressure change in excess of said preselected rate of change; means for preselecting the rate of change of said cabin pressure at which said last-named controlling means is made operative; and means made operative upon the attainment of a predetermined differential of cabin absolute pressure above external absolute pressure fixed by the structure of the aircraft to override both of said controlling means and operate said varying means to maintain such differential as long as external absolute pressure is such as to tend to increase the differential.

4. An aircraft compartment pressure control comprising: means for delivering air to said compartment under a pressure greater than ambient flight pressure; means for discharging air from said compartment; means for varying the rate of air discharge from said compartment relative to the rate of air delivery to said compartment whereby the absolute pressure within said cabin may be varied; means, including a first capsule subject to cabin absolute pressure and a second capsule subject to cabin differential pressure coacting through an interconnecting linkage system, for controlling said last-named means in such manner as to change the absolute pressure in said compartment in inverse straight-line proportion to changes in flight pressure altitude; means for controlling said varying means for inhibiting the time rate of change of said cabin absolute pressure during changes of altitude of said aircraft which produce a rate of cabin pressure change in excess of said preselected rate of change; means for preselecting the rate of change of said cabin pressure at which said last-named controlling means is made operative; means made operable by the attainment of a predetermined differential of cabin absolute pressure above external absolute pressure for overriding both of said aforesaid controlling means and thereafter operating said varying means to maintain said predetermined differential substantially constant as long as external absolute pressure is below a predetermined minimum value; and means operable in accordance with a selected ratio between cabin absolute pressure and external absolute pressure, also operatively connected to said varying means, to control cabin absolute pressure so as to maintain said ratio substantially constant so that said air delivery means is operated within its capabilities throughout even the highest altitude range of the aircraft.

5. An aircraft compartment pressure control comprising: means for delivering air to said compartment under a pressure greater than ambient flight pressure; means for discharging air from said compartment; means for varying the rate of air discharge from said compartment relative to the rate of air delivery to said compartment whereby the absolute pressure within said compartment may be varied; control means, including a first capsule subject to cabin absolute pressure and a second capsule subject to cabin differential pressure coacting through an interconnecting linkage system, for operating said last-named means to maintain the absolute pressure within said compartment as a straight-line function of flight pressure altitude; a time-rate-of-pressure-change means operable at a preselected rate of change to preclude the normal action of said control means whenever the change in pressure altitude of the aircraft causes said control means to change cabin absolute pressure at a rate in excess of the preselected rate; means for preselecting said rate of change at which said means is operable; and means carired by said time-rate-of-pressure-change means for rendering said control means inoperable and for rendering said time-rate-of-pressure-change means operable to supersede the action of said control means, whereby said time-rate-of-pressure-change means operates said varying means to change the absolute pressure within said compartment at the preselected rate of change.

6. An aircraft compartment pressure control comprising: means for delivering air to said compartment under a pressure greater than ambient flight pressure; means for discharging air from said compartment; means for varying the rate of air discharge from said compartment relative to the rate of air delivery to said compartment whereby the absolute pressure within said cabin may be varied; means, including a first capsule subject to cabin absolute pressure and a second capsule subject to cabin differential pressure coacting through an interconnecting linkage system, for controlling said varying means in such a manner as to change the absolute pressure in said compartment in inverse straight-line proportion to changes in pressure altitude of the aircraft; normally inoperative rate of pressure change means, made operative by the aircraft ascending or descending at a rate such as to cause operation of said primary control which produces changes in the absolute pressure of the compartment in excess of preselected rates of change of cabin pressure, for controlling said varying means to maintain the rate of pressure change within the cabin to said preselected rate of change; and means for preselecting said rates of change of cabin pressure.

7. An aircraft compartment pressure control comprising: means for delivering air to said compartment under a pressure greater than ambient flight pressure; means for discharging air from said compartment; means for varying the rate of air discharge from said compartment relative to the rate of air delivery to said compartment whereby the absolute pressure within said cabin may be varied; means, including a first capsule subject to cabin absolute pressure and a second capsule subject to cabin differential pressure coacting through an interconnecting linkage system, for controlling said varying means in such a manner as to change the absolute pressure in said compartment in direct proportion to changes in pressure altitude of the aircraft; rate of pressure change means, made operative by the aircraft ascending or descending at a rate such as to cause operation of said controlling means which produces changes in the absolute pressure of the compartment in excess of preselected rates of change of cabin pressure, for controlling said varying means to maintain the rate of pressure change within the cabin to said preselected rate of pressure change; and means for manually adjusting said rate of pressure change means to cause said rate of pressure change means to control the rate of cabin pressure change independently of the rate of change of the pressure altitude of the aircraft.

8. An aircraft compartment pressure control comprising: airflow means for circulating the flow of air under pressure through the compartment and including pressurizing inlet means, outlet means, and valve means for controlling the discharge of air through said outlet means; means for regulating said valve means so as to control the absolute pressure within said compartment as a straight line function of pressure altitude of said aircraft; and anticipating control means sensitive to transient changes in differential between quantities of flow in said inlet and outlet means, respectively, adapted to produce in said regulating means a response to said transient changes before any substantial change in the absolute pressure of the cabin can occur as a result of said transient changes.

9. An aircraft compartment pressure control comprising: airflow means for circulating a flow of air under pressure through the compartment, said airflow means including inlet, outlet, and valve means for controlling said flow; means responsive to both cabin absolute pressure and flight pressure altitude so organized and arranged that the cabin absolute pressure is controlled to change at a predetermined ratio to the variation of pressure altitude of the aircraft from a preselected pressure altitude through regulation of said valve means, said valve controlling means including means defining a pressure chamber of restricted volume; and anticipating control means adapted to transmit to said chamber a pressure derived as a differential result of the flows in said inlet and outlet means, respectively, whereby to normally maintain in said chamber a pressure equal to cabin pressure and varying in step with cabin pressure in response to gradual changes in said inlet and outlet flows but effective in response to transient differences in said flows to change the pressure in said chamber in anticipation of corresponding changes in the pressure of the air within the compartment and to thereby actuate said valve controlling means to effect a corrective adjustment of said valve means so as to anticipate and prevent said corresponding changes in pressure in cabin air.

10. An aircraft compartment pressure control comprising: means for delivering air to said compartment under a pressure greater than ambient flight pressure; means for discharging air from said compartment; means for varying the rate of air discharge from said compartment relative to the rate of air delivery to said compartment whereby the absolute pressure within said cabin may be varied; means, including a first capsule subject to cabin absolute pressure and a second capsule subject to cabin differential pressure coacting through an interconnecting linkage system, made operative by said aircraft reaching a preselected pressure altitude for controlling said last-named means, thereby regulating the absolute pressure in said compartment to change said pressure in inverse straight-line proportion to changes in pressure altitude of said aircraft above the preselected pressure altitude; means for preselecting said pressure altitude; means including manually operable means for changing said proportion, said changing means being operable independently of said preselecting means whereby said proportion may be varied during flight of said aircraft without altering the said preselected pressure altitude at which said regulating means is made operative; and means controlled by operation of said manually operable means for indicating at any of the selected proportions the absolute pressure within said cabin as simulated cabin pressure altitude at any particular pressure altitude of said aircraft.

11. In an aircraft: a cabin adapted to be supercharged to maintain pressure in excess of that of the ambient atmosphere; means for supplying air to said cabin; means including a valve for discharging air from said cabin; means for controlling said valve to normally control cabin absolute pressure to change as a direct ratio of changes in the pressure altitude of the aircraft; time-rate-of-pressure-change means for supervising and vetoing control action instituted by the first said means; control means for overriding the action of both the aforementioned means and limiting the maximum cabin differential pressure to predetermined safe limits; means constituting an air flow conduit between said air supplying means and said air discharge means including a portion wherein pressure is higher than cabin pressure and another portion wherein pressure is lower than cabin pressure; means respectively flow-connecting a point in said conduit wherein the pressure is normally equal to cabin pressure to said ratio-to-flight cabin pressure control means and to said overriding pressure control means; and means flow-connecting said time-rate-of-pressure-change control means to said conduit adjacent said lower pressure point, whereby to make said pressure control means highly sensitive to air flow surges and maintain smooth automatic regulation of cabin pressure independent of transient changes in the air flow in said delivery and discharge means.

12. In an aircraft having a cabin adapted to be pressurized: a pressure discharge valve in said cabin; means for operating said valve; a cabin pressure regulating means for controlling said valve operating means; an electroresponsive means operable when energized to actuate said operating means to open said valve; a landing gear carried by said aircraft comprising two relatively movable components, one of said components adapted to engage the ground; circuit means connected to said electroresponsive means and including normally open switch means closed when said last named component is in engagement with the ground whereby said electroresponsive means is energized when the gear component is engaging the ground and the valve opened to obviate pressurization of the cabin due to inadvertent setting of said regulator below the pressure altitude of the landing field from causing cabin pressurization prior to flight and for equalizing cabin absolute pressure with ambient absolute pressure upon landing of the aircraft; and means including a time-rate-of-pressure-change regulating means for limiting the rate of change of cabin absolute pressure upon landing of the aircraft to prevent said pressure from decreasing in excess of some predetermined rate of change.

13. An aircraft compartment pressure control comprising: a pressure discharge valve including actuating means associated therewith; cabin pressure regulating means for operating said actuating means; an electro-responsive means operable when energized to control said actuating means and to render said regulating means inoperative; means responsive to the temperature within said compartment; switch means controlled by said temperature responsive means and connected to energize said electro-responsive means upon the temperature of the cabin exceeding a predetermined temperature to render said regulating means inoperative and to operate said valve actuating means to open said valve; and means for supervising and limiting the valve action to limit the rate of pressure decrease in the compartment.

14. An aircraft compartment pressure control comprising: means for delivering air to said compartment under a pressure greater than ambient flight pressure; means for discharging air from said compartment; means for varying the rate of air discharge from said compartment relative to the rate of air delivery to said compartment whereby the absolute pressure within said cabin may be varied; means for controlling said last-named means in such manner as to change the absolute pressure in said compartment in direct proportion to changes in flight pressure altitude; means for controlling said varying means for inhibiting the time-rate-of-change of said cabin absolute pressure during changes of altitude of said aircraft which produce a rate of cabin pressure change in excess of preselected rates of change; electro-responsive means operable when energized to control said varying means and to render said first-named controlling means inoperative; means within said compartment responsive to the temperature of the air therein; switch means controlled by said temperature responsive means and moved to closed position to energize said electro-responsive means to render said first-named controlling means inoperative and to operate said varying means to reduce the pressure within said cabin when the temperature of the cabin exceeds a predetermined temperature, said second-named controlling means being still operative to inhibit the time-rate-of-change of said cabin absolute pressure to prevent the rate of pressure decrease in the cabin from exceeding said preselected rates of change.

15. In an aircraft having a compartment adapted to be pressurized: a pressure-air inlet and an air outlet for said compartment; valve means for controlling said outlet; means for actuating said valve; regulatory means responsive to absolute cabin pressure and the flight pressure and operatively interposed between said inlet and outlet for operating said valve actuating means to regulate the changes in the absolute pressure in said compartment as a direct ratio of changes in flight pressure altitude during any chosen flight schedule; means for holding the time-rate-of-change of the absolute pressure within said compartment within predetermined increase and decrease limits during changes of said pressure altitude; a landing gear carried by said aircraft comprising two relatively movable components, one being adapted to engage the ground; electroresponsive means operable when energized to render said regulatory means inoperative and to control said actuating means to open said valve; circuit means for said electroresponsive means including normally open switch means closed when said gear component is engaging the ground whereby said electroresponsive means is energized when said component is engaging the ground to prevent inadvertent settings of said regulating means below the pressure altitude of the landing field from causing cabin pressurization prior to flight and for equalizing cabin absolute pressure with ambient absolute pressure upon landing of the aircraft, said time-rate-of-change means being operative to prevent the rate of cabin pressure decrease, during energization of said electroresponsive means, from exceeding the predetermined decrease limit.

16. In an aircraft having a compartment adapted to be pressurized: means for delivering air to said compartment under a pressure greater than ambient flight pressure; means for discharging air from said compartment; means for varying the rate of air discharge from said compartment relative to the rate of air delivery to said compartment whereby the absolute pressure within said cabin may be varied; manually adjustable means for controlling said varying means to selectively control the absolute pressure within said compartment in accordance with some desired schedule; an electroresponsive means operable when energized to actuate said varying means to decrease the pressure within said compartment; a landing gear carried by said aircraft comprising two relatively movable components, one of said components adapted to engage the ground; circuit means connected to said electroresponsive means and including normally open switch means closed when said last named component is in engagement with the ground, whereby the varying means is operated to maintain the cabin differential pressure at zero when the aircraft is on the ground to obviate pressurization of the compartment due to inadvertent setting of said manually adjustable means from causing pressurization prior to flight and whereby the cabin differential pressure is reduced to zero when the aircraft lands after a flight during which said compartment has been pressurized.

17. An aircraft compartment pressure control comprising: means for delivering air to said compartment under a pressure greater than ambient flight pressure; means for discharging air from said compartment; regulating means for varying the rate of air discharge from said compartment whereby the absolute pressure within said cabin may be varied; electroresponsive means operable when energized to so actuate said varying means that the rate of air discharge from said compartment is greater than the rate of air delivery to said compartment whereby the pressure within said compartment is reduced; a landing gear carried by said aircraft comprising two relatively movable components, one of said components adapted to engage the ground; and circuit means connected to said electroresponsive means and including normally open switch means closed when said last named component is in engagement with the ground whereby said electroresponsive means is energized when the gear component is engaging the ground and the varying means actuated to obviate pressurization of the cabin due to inadvertent setting of said regulating means below the pressure altitude of the landing field from causing cabin pressurization prior to flight and for equalizing cabin absolute pressure with ambient absolute pressure upon landing of the aircraft.

18. An aircraft cabin pressure control system, comprising: means for delivering air to said cabin under a pressure greater than ambient flight pressure; a valve for discharging air from said cabin; means for operating said valve to vary the rate of air discharge from said cabin relative to the rate of air delivery to said cabin whereby the absolute pressure within said cabin may be varied; a first capsule responsive to changes in cabin absolute pressure, operatively connected to said valve operating means and adapted to actuate the same to maintain cabin absolute pressure substantially constant; a second capsule, responsive to changes in cabin differential pressure, the rate of axial expansion of which decreases with increase in pressure altitude of said aircraft; and mechanism interconnecting said second capsule and said valve operating means for opposing the action of said first capsule on said operating means; said mechanism being so arranged that the incremental effect of such opposition progressively increases as the pressure altitude of the aircraft increases to so actuate said valve operating means as to decrease the cabin absolute pressure in inverse straight-line proportion to increase in pressure altitude of the aircraft and to increase the cabin absolute pressure in inverse straight-line proportion to decrease in pressure altitude of the aircraft.

19. An aircraft cabin pressure control system, comprising: means for delivering air to said cabin under a pressure greater than ambient flight pressure; a valve for discharging air from said cabin; means for operating said valve to vary the rate of air discharge from said cabin relative to the rate of air delivery to said cabin whereby the absolute pressure within said cabin may be varied; a first capsule responsive to changes in cabin absolute pressure, operatively connected to said valve operating means and adapted to actuate the same to maintain cabin absolute pressure substantially constant above a preselected pressure altitude to create a cabin differential pressure above said preselected pressure altitude; a second capsule subject to cabin differential pressure, the rate of axial expansion of which decreases with increase in pressure altitude of said aircraft; and mechanism interconnecting said second capsule and said valve operating means made operative by creation of cabin differential pressure for opposing the action of said first capsule on said operating means; said mechanism being so arranged that the incremental effect of such opposition progressively increases as the pressure altitude increases to so actuate said valve operating means as to decrease the cabin absolute pressure in inverse straight-line proportion to increase in pressure altitude of the aircraft; and means for preselecting the pressure altitude at which said first capsule becomes operative.

20. An aircraft cabin pressure control system, comprising: means for delivering air to said cabin under a pressure greater than ambient flight pressure; a valve for discharging air from said cabin; means for operating said valve to vary the rate of air discharge from said cabin relative to the rate of air delivery to said cabin whereby the absolute pressure within said cabin may be varied; a first capsule responsive to changes in cabin absolute pressure, operatively connected to said valve operating means and adapted to actuate the same to maintain cabin absolute pressure substantially constant; a second capsule, responsive to changes in cabin differential pressure, the rate of axial expansion of which decreases with increase in pressure altitude of said aircraft; and mechanism interconnecting said second capsule and said valve operating means for opposing the action of said first capsule on said operating means; said mechanism being so arranged that the incremental effect of such opposition progressively increases as the pressure altitude increases to so actuate said valve operating means as to decrease the cabin absolute pressure in inverse straight-line proportion to increase in pressure altitude of the aircraft; and means for changing said proportion during flight of said aircraft.

21. An aircraft cabin pressure control system comprising: means for delivering air to the compartment under a pressure greater than ambient flight pressure; a valve for discharging air from said cabin; means for operating said valve to vary the rate of air discharge from said compartment relative to the rate of air delivery to said compartment to effect variation in the absolute pressure within said compartment; means for controlling said operating means; cabin absolute pressure sensitive means; cabin differential pressure sensitive means; and a mechanical, differential-lever linearly responsive linkage system operatively interposed between said cabin differential pressure sensitive means and said absolute pressure sensitive means and operatively connected at the one end to said cabin differential pressure sensitive means and rotatably linked at the opposite end to said cabin absolute pressure sensitive means, said rotative connection being also connected to said controlling means, and said linearly responsive linkage being so organized geometrically and kinematically within itself and with respect to said two sensitive means and said controlling means as to respond linearly and integratingly to the motions of both said sensitive means and progressively but decrementally modulate the responses of said cabin absolute pressure sensitive means to changes in the latter mentioned pressure as cabin differential pressure increases thereby to constrain said cabin absolute pressure to follow a straight line function of the pressure altitude of the aircraft.

22. An aircraft cabin pressure control system, comprising: means for delivering air to said cabin under a pressure greater than ambient flight pressure; a valve for discharging air from said cabin; means for operating said valve to vary the rate of air discharge from said cabin relative to the rate of air delivery to said cabin whereby the absolute pressure within said cabin may be varied; a first capsule responsive to changes in cabin absolute pressure; articulated linkage interconnecting said first capsule and said valve operating mechanism and adapted to actuate the same to maintain cabin absolute pressure substantially constant; a second capsule subject to cabin differential pressure, the rate of axial expansion of which decreases with increase in pressure altitude of said aircraft; a first link pivotally connected at one end to said second capsule; a second link pivotally interconnecting said articulated linkage and the free end of said first link; a third link; and means for pivotally mounting one end of said third link; the other end of said third link being pivotally connected to said first and second links at the pivotal connection therebetween, the angular relationship of said links being such that the same opposes the action of said first capsule on said articulated linkage, the incremental effect of such opposition progressively increasing, as the pressure altitude of the aircraft increases, whereby the said valve operating means is actuated to decrease the cabin absolute pressure in inverse straight-line proportion to increase in pressure altitude of the aircraft.

23. An aircraft cabin pressure control system, comprising: means for delivering air to said cabin under a pressure greater than ambient flight pressure; a valve for discharging air from said cabin; means for operating said valve to vary the rate of air discharge from said cabin relative to the rate of air delivery to said cabin whereby the absolute pressure within said cabin may be varied; a first capsule responsive to changes in cabin absolute pressure; articulated linkage interconnecting said first capsule and said valve operating mechanism and adapted to actuate the same to maintain cabin absolute pressure substantially constant; a second capsule subject to cabin differential pressure, the rate of axial expansion of which decreases with increase in pressure altitude of said aircraft; a first link pivotally connected at one end to said second capsule; a second link pivotally interconnecting said articulated linkage and the free end of said first link; a third link; means for pivotally mounting one end of said third link, the other end of said third link being pivotally connected to said first and second links at the pivotal connection therebetween; the angular relationship of said links being such that the same opposes the action of said first capsule on said articulated linkage, the incremental effect of such opposition progressively increasing as the pressure altitude of the aircraft increases, whereby said valve operating means is actuated to decrease the cabin absolute pressure in inverse straight-line proportion to increase in pressure altitude of the aircraft; and means for adjusting the position of said means for pivotally mounting the one end of said third link to vary the effect of the opposition of said links and alter said proportion.

24. An aircraft cabin pressure control system as claimed in claim 18, and, in addition thereto: a time-rate-of-pressure-change means subject to cabin absolute pressure also operatively connected to said valve operating means and adapted to actuate said operating means to controllably vary the rate of air discharge from said cabin whenever the rate of cabin absolute pressure effected by actuation of said operating means by conjoint action of said first and second capsules exceeds a predetermined rate of pressure change.

25. An aircraft cabin pressure control system as claimed in claim 18, and, in addition thereto: a third capsule responsive to changes in cabin differential pressure also operatively connected to said valve operating means and adapted whenever cabin differential pressure exceeds a predetermined differential pressure, to actuate said valve operating means to increase the rate of air discharge from said cabin to decrease the cabin absolute pressure to maintain cabin differential pressure at a value substantially equal to said predetermined differential pressure.

26. An aircraft cabin pressure control system as claimed in claim 18, and, in addition thereto: a third capsule responsive to changes in cabin differential pressure also operatively connected to said valve operating means and adapted, whenever cabin differential pressure exceeds a predetermined differential pressure, to actuate said valve operating means to increase the rate of air discharge from said cabin to decrease the cabin absolute pressure to maintain cabin differential pressure at a value less than said predetermined differential pressure; and means for reducing said cabin differential pressure progressively upon the ascent of the aircraft above a preselected, relatively high flight pressure altitude, to maintain a cabin absolute pressure to ambient flight pressure ratio not exceeding the maximum compression ratio of said air delivering means, whereby a substantially constant quantity of air can be supplied to the cabin by said air delivery means at such compression ratio at all flight altitudes of the aircraft.

27. An aircraft cabin pressure control system as claimed in claim 18, and, in addition thereto: a time-rate-of-pressure-change means subject to cabin absolute pressure also operatively connected to said valve operating means and adapted to actuate said operating means to controllably vary the rate of air discharge from said cabin whenever the rate of cabin absolute pressure change effected by actuation of said operating means by the conjoint action of said first and second capsules and said mechanism exceeds a predetermined rate of pressure change; and manually operable means for preselecting the rate of change of said cabin pressure at which said last-named controlling means is made operative.

28. A pressure regulating device for use in a system for regulating pressure within a pressurizable aircraft compartment, comprising: a container open to compartment absolute pressure; a first capsule responsive to changes in compartment absolute pressure mounted within said container; a second capsule mounted within said container responsive to changes in cabin differential pressure; a pair of spaced means within said container connected respectively to cabin pressure increasing and cabin pressure decreasing means; selecting means mounted between said spaced means for movement from positions intermediate said spaced means into engagement with one or the other of said spaced means; articulated linkage interconnecting said first capsule and said selecting means; a first link pivotally connected at one end to said second capsule; a second link pivotally interconnecting said articulated linkage and the free end of said first link; a third link; means for pivotally mounting one end of said third link, the other end of said third link being pivotally connected to said first and second links at the pivotal connection therebetween; the angular relationship of said links being such that the same opposes the action of said first capsule on said articulated linkage, the incremental effect of such opposition progressively increasing as the pressure altitude of the aircraft increases whereby the selecting means is so moved relative to said spaced means to vary the cabin absolute pressure in inverse straight-line proportion to changes in pressure altitude of the aircraft.

29. In an aircraft having a cabin adapted to be pressurized: a supercharging means for supplying air to said cabin under a pressure greater than ambient flight pressure; an outlet valve for discharging vitiated air from said cabin; means for operating said valve to vary the rate of air discharge from said cabin relative to the rate of air delivery thereinto whereby the absolute pressure within said cabin may be varied; means, including manually operable means, for controlling said valve operating means to selectively control cabin absolute pressure; a landing gear carried by said aircraft comprising two relatively movable components, one of said components adapted to engage the ground when the aircraft is supported thereon; and normally inoperative means operatively connected to said valve operating means and including means operatively connected to said ground engaging component, made operative when said component is in engagement with the ground to actuate said valve operating means to open the valve to obviate a difference between cabin pressure and ambient flight pressure whenever said ground-engaging component is in engagement with the ground.

30. An aircraft cabin pressure control system, comprising: means for delivering air to said cabin under a pressure greater than ambient flight pressure; means for discharging air from said cabin; means for varying the rate of air discharge from said cabin relative to the rate of air delivery to said compartment whereby the absolute pressure within said cabin may be varied; means, including a first capsule subject to cabin absolute pressure and a second capsule subject to cabin differential pressure coacting through an interconnecting linkage system, for controlling said last-named means for regulating the absolute pressure in said compartment throughout a medium pressure altitude range so as to change said pressure in inverse straight-line proportion to changes in pressure altitude of said aircraft; differential pressure sensitive means, also operatively connected to said discharge varying means, to main a substantially constant differential of cabin absolute pressure over atmospheric pressure throughout a higher altitude range; and means operable in accordance with a selected ratio between cabin absolute pressure and atmospheric pressure, also operatively connected to the discharge varying means, to maintain such ratio substantially constant throughout the highest altitude range of the aircraft.

BRUCE E. DEL MAR.

REFERENCES CITED

The following references are of record in the file of this patent:

UNITED STATES PATENTS

| Number | Name | Date |
|---|---|---|
| 2,307,199 | Cooper | Jan. 5, 1943 |
| 2,342,220 | Price | Feb. 22, 1944 |
| 2,391,197 | Schwein | Dec. 18, 1945 |
| 2,396,116 | Noxon | Mar. 5, 1946 |
| 2,407,257 | Del Mar | Sept. 10, 1946 |
| 2,407,258 | Del Mar | Sept. 10, 1946 |
| 2,407,540 | Del Mar | Sept. 10, 1946 |
| 2,413,027 | Maxson | Dec. 24, 1946 |
| 2,419,707 | Cooper et al. | Apr. 29, 1947 |
| 2,424,491 | Morris | July 22, 1947 |
| 2,433,206 | Dube | Dec. 23, 1947 |
| 2,441,592 | Paget | May 18, 1948 |
| 2,449,231 | Jerger | Sept. 14, 1948 |
| 2,450,076 | Bechberger | Sept. 28, 1948 |
| 2,450,881 | Cooper et al. | Oct. 12, 1948 |

FOREIGN PATENTS

| Number | Country | Date |
|---|---|---|
| 514,055 | France | Nov. 8, 1920 |
| 521,623 | Great Britain | May 27, 1940 |
| 563,553 | Great Britain | Aug. 21, 1944 |